United States Patent
Hoang et al.

(10) Patent No.: US 12,078,771 B2
(45) Date of Patent: *Sep. 3, 2024

(54) OBSTACLE DETECTION SYSTEMS AND METHODS

(71) Applicant: ConocoPhillips Company, Houston, TX (US)

(72) Inventors: Phuong Hoang, Houston, TX (US); Khalid A. Soofi, Houston, TX (US); Benjamin Lascaud, Houston, TX (US); Patrick R Boyle, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,562

(22) Filed: Jun. 7, 2022

(65) Prior Publication Data

US 2023/0012212 A1    Jan. 12, 2023

Related U.S. Application Data

(63) Continuation of application No. 16/935,009, filed on Jul. 21, 2020, now Pat. No. 11,353,618.

(Continued)

(51) Int. Cl.
*G01V 3/20* (2006.01)
*E21B 49/00* (2006.01)
(Continued)

(52) U.S. Cl.
CPC ............... *G01V 3/20* (2013.01); *E21B 49/00* (2013.01); *G01C 11/00* (2013.01); *G01C 15/002* (2013.01)

(58) Field of Classification Search
CPC ....... E21B 49/00; G01C 11/00; G01C 15/002; G01V 3/20
See application file for complete search history.

(56) References Cited

U.S. PATENT DOCUMENTS

| 4,068,160 A | 1/1978 | Hunt |
| 6,101,431 A | 8/2000 | Niwa et al. |

(Continued)

FOREIGN PATENT DOCUMENTS

| CN | 107045147 A | 8/2017 |
| WO | WO-2018132786 A1 | 7/2018 |
| WO | WO-2018217875 A1 | 11/2018 |

OTHER PUBLICATIONS

Afzal, Atefeh, et al—Decomposition of cyclohexanoic acid by the UV/H2O2 process under various conditions, 2012, Elsevier, Science of the Total Environment, 426, pp. 387-392; 6 pgs.

(Continued)

*Primary Examiner* — Elias Desta
(74) *Attorney, Agent, or Firm* — Polsinelli PC

(57) ABSTRACT

A system and method of detecting subsurface karst features includes receiving surface mapping data. A potential surface pad location can be identified in view of the surface mapping data. A resistivity survey for the potential surface pad location can be designed. The resistivity survey can include at least one long line extending through a surface hole for each of one or more wellbores in the potential surface pad location, and a short line extending through the surface hole of one of the one or more wellbores, each short line intersecting the long line substantially at the surface hole of one of the one or more wellbores. High resistivity areas exceeding approximately 150 Ohm per meter can be identified as sub surface karst features within the resistivity survey.

20 Claims, 33 Drawing Sheets

Related U.S. Application Data

(60) Provisional application No. 62/876,727, filed on Jul. 21, 2019.

(51) Int. Cl.
  *G01C 11/00* (2006.01)
  *G01C 15/00* (2006.01)

(56) References Cited

U.S. PATENT DOCUMENTS

| | | |
|---|---|---|
| 6,502,037 B1 | 12/2002 | Jorgensen et al. |
| 7,333,893 B2 | 2/2008 | Burtz et al. |
| 7,796,468 B2 | 9/2010 | Kellogg |
| 7,874,358 B2 | 1/2011 | Breukelman et al. |
| 9,823,089 B1 | 11/2017 | Wilcox et al. |
| 10,891,497 B2 | 1/2021 | Cox et al. |
| 2005/0240348 A1 | 10/2005 | Knight et al. |
| 2007/0038378 A1 | 2/2007 | Gelfand et al. |
| 2007/0255501 A1 | 11/2007 | Kellogg |
| 2009/0000784 A1 | 1/2009 | Breukelman et al. |
| 2010/0091611 A1 | 4/2010 | Laake |
| 2015/0331971 A1* | 11/2015 | Scollard ............... G01V 99/005 703/1 |
| 2018/0340408 A1* | 11/2018 | Samuel ................. E21B 47/022 |
| 2019/0204464 A1 | 7/2019 | Moore, III et al. |
| 2020/0158898 A1 | 5/2020 | Le Guern et al. |
| 2021/0018646 A1 | 1/2021 | Hoang et al. |

OTHER PUBLICATIONS

Andreozzi, Roberto, et al—"Advanced oxidation processes (AOP) for water purification and recovery", 1999, Elsevier, Catalysis Today 53, pp. 51-19; 9 pgs.

Drees, Kevin P., et al—"Comparative electrochemical inactivation of bacteria and bacteriophage", 2003, Pergamon, Water Research 37, pp. 2291-2300; 10 pgs.

El-Din, Mohamed Gamal, et al—"Naphthenic acids speciation and removal during petroleum-coke adsorption and ozonation of oil sands process-affected water", 2011, Elsevier, Science of the Total Environment 409, pp. 5119-5125.

Esplugas, Santiago, et al—"Comparison of different advanced oxidation processes for phenol degradation", 2002, Pergamon, Water Research 36, pp. 1034-1042; 9 pgs.

Hoang, Phuong et al., "An integrated workflow to detect and avoid shallow karst drilling-hazards in the Delaware Basin", 2019, Unconventional Resources Technology Conference, 32 pages.

Hoang, Phuong et al., "An integrated workflow to detect and avoid shallow karst drilling-hazards in the Delaware Basin", URTeC: 385, 2019, Unconventional Resources Technology Conference, 20 pages.

Hsu, Yung-Chien, et al—"Calcium enhanced COD removal for the ozonation of phenol solution", 2007, Elsevier, Water Research 42, pp. 71-78; 8 pgs.

International Search Report and Written Opinion for International Application No. PCT/US2020/042918 mailed Oct. 21, 2020, 9 pages.

Jeong, Joonseon, et al—"The Role of Reactive Oxygen Species in the Elecrochemical Inactivation of Microorganisms", 2006, Environmental Science and Technology, Abstract only; 2 pgs.

Kusic, Hrvoje, et al—"Minimization of organic pollutant content in aqueous solution by means of AOPs: UV-and ozone-based technologies", 2006, Elsevier, Chemical Engineering Journal 123, pp. 127-137; 11 pgs.

Liang, Xiaoming, et al—"Comparison of four advanced oxidation processes for the removal of naphthenic acids from model oil sands process water", 2011, Elsevier, Journal of Hazardous Materials, 190, pp. 168-176; 9 pgs.

Perez-Estrada, Leonidas, et al—"Structure-Reactivity of Naphthenic Acids in the Ozonation Process", 2011, Environmental Science and Technology, Abstract only; 2 pgs.

Scott, Angela C., et al—"Ozonation of oil sands process water removes naphthenic acids and toxicity", 2008, Elsevier, Chemosphere 71, pp. 156-160; 5 pgs.

Tanneru, Charan Tej, et al—"Mechanisms of virus control during iron electrocoagulation—Microfiltration of surface water", 2012, Water Research 46, pp. 2111-2120; 10 pgs.

Wu, Jiangning, et al—"Oxidation of aqueous phenol by ozone and peroxidase", 2000, Elsevier, Advances in Environmental Research 4, pp. 339-346; 8 pgs.

Revil A et al. "Review: Some low-frequency electrical methods for subsurface characterization and monitoring in hydrogeology", Hydrogeology Journal, Official Journal of The International Association of Hydrogeologists, Springer, Berlin, De, vol. 20, No. 4, Feb. 10, 2012 (Feb. 10, 2012), pp. 617-658, XP035061797, ISSN: 1435-0157, DOI:10.1007/S10040-011-0819-X.

Supplementary European Search Report for Application No. EP 20 84 4077 dated Jul. 11, 2023 (6 pages).

\* cited by examiner

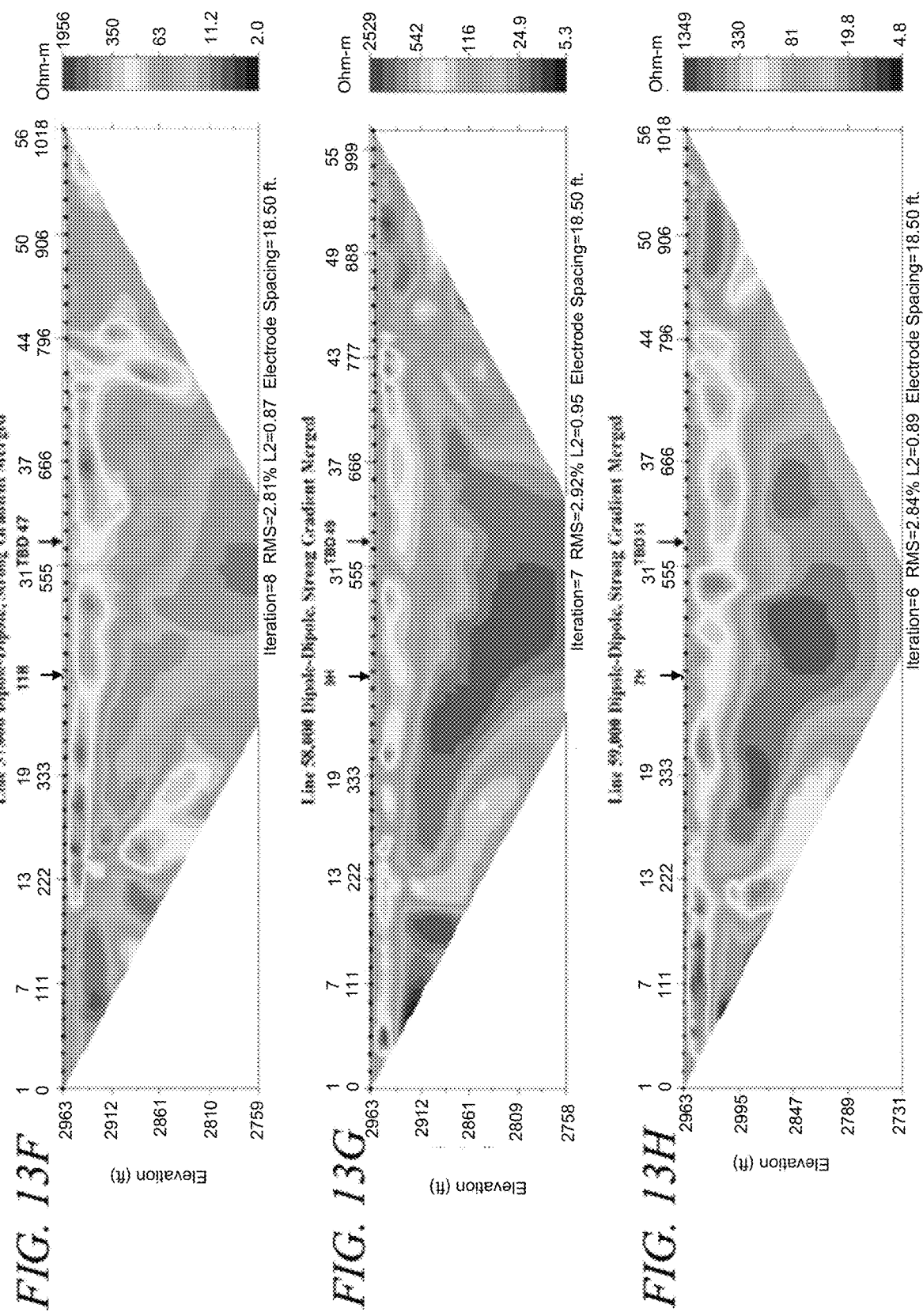

OBSTACLE DETECTION SYSTEMS AND METHODS

CROSS-REFERENCE TO RELATED APPLICATIONS

The present application is a continuation of U.S. Non-Provisional application Ser. No. 16/935,009, entitled "Obstacle Detection Systems and Methods" and filed on Jul. 21, 2020, which claims priority to U.S. Provisional Application No. 62/876,727, entitled "Obstacle Detection System and Method" and filed on Jul. 21, 2019. Each of these applications is specifically incorporated by reference in its entirety herein.

BACKGROUND

1. Field

The present inventive concept generally relates to systems and methods for obstacle detection and more particularly to the detection and avoidance of shallow karsts in subterranean formations.

2. Description of Related Art

Hydrocarbon production from subterranean formations generally involves the formation of one or more wellbores into an earthen surface and through at least a portion of the subterranean formation. The subterranean formation may include obstacles that impact and/or prevent drilling operations, and in many cases such obstacles are not visible in aerial surveys and the like. For example, in some reservoirs, dipping carbonate and evaporate outcrops facilitate meteoric recharge of saline aquifers, which through time create karst features. Karst features are a source of shallow drilling hazards, typically encountered within the first thousand feet below ground level. Subterranean obstacles, such as karst features, can cause loss of drilling fluid, wellbore instability, bit drops, and/or risk to surface equipment. It is with these observations in mind, among others, that various aspects of the present disclosure were conceived and developed.

SUMMARY

Implementations described and claimed herein address the foregoing problems by providing systems and methods for obstacle detection. In one implementation, surface mapping data from one or more satellite images of an area of interest corresponding to a subterranean formation is received. Surface topography data of the area of interest is received from one or more light detection and ranging (LiDAR) systems, and an airborne gravity data set and a seismic data set of the area of interest are received. A potential surface pad location is identified using at least one of the surface mapping data, the surface topography data, the airborne gravity data set, or the seismic data set. The potential surface pad location includes a surface hole for each of one or more wellbores. A resistivity survey is generated for the potential surface pad location. The resistivity survey includes at least one long line extending through the surface hole for each of the one or more wellbores and at least one short line extending through the surface hole of one of the one or more wellbores. Each short line intersects the long line at the surface hole of one of the one or more wellbores. It is determined whether one or more subsurface karst features are present within the subterranean formation disposed relative to at least one of the potential surface pad location or the one or more wellbores using the resistivity survey.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The patent or application file contains at least one drawing executed in color. Copies of this patent or patent application with color drawing(s) will be provided by the Office by request and payment of the necessary fee.

FIG. 13F illustrates an example 2D resistivity profile for short line 4 of the example wellsite of FIGS. 12A-12G.

FIG. 13G illustrates an example 2D resistivity profile for short line 5 of the example wellsite of FIGS. 12A-12G.

FIG. 13H illustrates an example 2D resistivity profile for short line 6 of the example wellsite of FIGS. 12A-12G.

DETAILED DESCRIPTION

Figure 1:
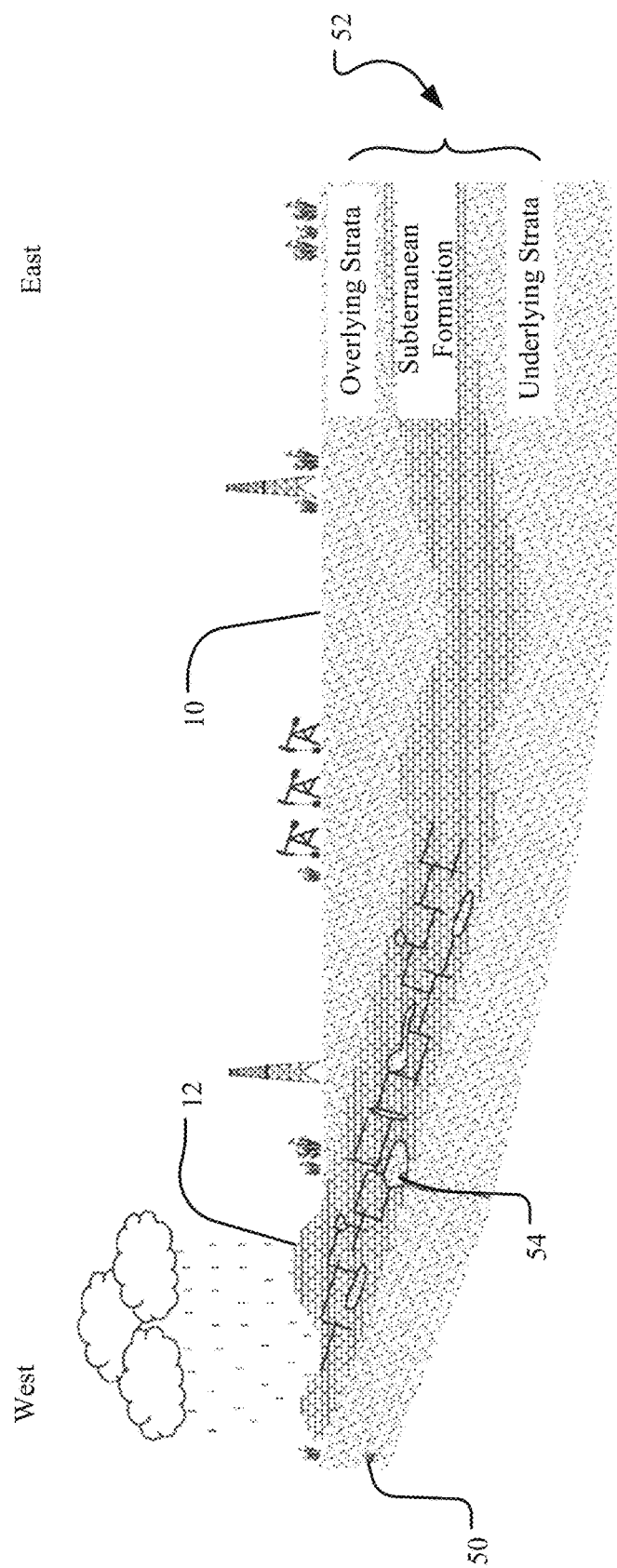
FIG. 1 is a diagrammatic environmental view of an example subterranean formation.

Aspects of the presently disclosed technology generally involve systems and methods to detect obstacles, such as subsurface karst features, within a subterranean formation. In one aspect, surface mapping data is received from one or more satellite images of an area of interest, surface topography data of the area of interest is received from one or more light detection and ranging (LiDAR) systems, and an airborne gravity data set and a seismic data set of the area of interest are received. A potential surface pad location is identified in view of the surface mapping data, the surface topography data, the airborne gravity data set, and/or the seismic data set. The potential surface pad location can include a surface hole for each of one or more wellbores.

A resistivity survey is designed for the potential surface pad location. The resistivity survey may include at least one long line extending through the surface hole for each of the one or more wellbores and at least one short line extending through the surface hole of one of the one or more wellbores. Each short line intersects the long line substantially at the surface hole of one of the one or more wellbores. High resistivity areas, for example those exceeding approximately 150 Ohm per meter, can be identified within the resistivity survey as subsurface karst features, and the potential surface pad location and/or the one or more wellbores can be adjusted in view of the high resistivity areas to avoid the subsurface karst features or similar obstacles.

In some aspects, high resistivity areas with resistivity of approximately 150 Ohm per meter to approximately 400 Ohm per meter are identified as subsurface karst features filled with sediment and/or air, and high resistivity areas with resistivity of approximately 400 Ohm per meter to approximately 40,000 Ohm per meter are identified as subsurface karst features filled with air. A second potential pad location in view of the high resistivity areas may be identified, with a new resistivity survey for the second potential pad location being design. In one aspect, the long line includes a plurality of electrodes, and the plurality of electrodes may be disposed with substantially even spacing. The at least one short lines can include a plurality of electrodes disposed thereon at substantially even spacing. In one example, the potential surface pad location includes four linearly arranged proposed wellbores. The long line of the resistivity survey can extend through each of the four linearly arranged proposed wellbores and four short lines, and one of the four short lines extends through each of the four linearly arranged proposed wellbores. A distal electrode may be linearly disposed from the long line, thereby increasing a depth measurement for the resistivity survey. The distal electrode can be positioned approximately 2,000 feet from an end of the long line. The distal electrode can create a pole dipole survey setting.

Overall, the presently disclosed technology is an integrated system and method for detect and avoid shallow drilling hazards, such as karst features, in subterranean formations during hydrocarbon production, through remote sensing, seismic, airborne gravity and resistivity surveys, and/or the like. As such, the presently disclosed technology increases production, avoids loss of drilling fluid, increases wellbore stability, decreases bit drops and risk to surface equipment, and/or the like. Other advantages will be apparent from the present disclosure.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples are given by way of illustration only and not by way of limitation. Various substitutions, modifications, additions and/or rearrangements within the spirit and/or scope of the presently disclosed technology will become apparent to those skilled in the art from this disclosure.

I. Terminology

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "substantially," as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

II. General Architecture

Generally, the systems and methods disclosed herein involve identifying, detecting, and/or avoiding one or more subsurface karst features within a subterranean formation. The identification and detection of one or more subsurface karst features within a subterranean formation can assist in pad placement and/or wellbore placement. Placing a pad and/or one or more wellbores above a subsurface karst can disrupt and/or prevent efficient operations by causing loss of drilling fluid, wellbore instability, bit drops, and/or risk to surface equipment. As such, the presently disclosed technology implements one or more of surface mapping (e.g. satellite imagery, LiDAR, etc.), air-borne gravity, three-dimensional seismic data, and/or resistivity data to collectively identify the location of possible sub-surface karsts within a formation. A pad drilling location may be positioned based on the location of possible subsurface karsts. By positioning the pad drilling location in this manner, a wellbore is positioned to avoid passing through subsurface karsts during drilling.

To begin a detailed description of example systems and methods for subsurface obstacle detection and avoidance, reference is made to FIG. 1, which illustrates a diagrammatic cross-section view of an example earthen surface 10 and subterranean formation 50. The earthen surface 10 can support shrubbery, equipment, and/or the like while having natural topographic features, including surface karsts 12.

The subterranean formation 50 can be disposed below the earthen surface 10 and be formed of a plurality of layers of strata 52 (e.g. surface strata, subterranean formation, underlying strata, etc.). One or more subsurface karsts 54 can be formed with a saline aquifer within the subterranean formation 50, thus posing drilling risks involved with formation of one or more wellbores through these locations.

The surface karsts 12 and/or the subsurface karsts 54 can be formed through the meteoric recharge of saline aquifers within the subterranean formation. The subsurface karsts 54 can be filled with air, sediment, water, and/or combinations thereof. Identification and detection of the subsurface karsts 54 through the presently disclosed technology prevents wellbore washout, drilling fluid loss, abandonment of surface wellbore locations, and/or the like. Thus, the presently disclosed technology identifies the possible locations of the subsurface karsts 54 using surface mapping (e.g. satellite imagery, LiDAR, etc.), air-borne gravity, three-dimensional seismic data, and/or resistivity data.

Figure 2:
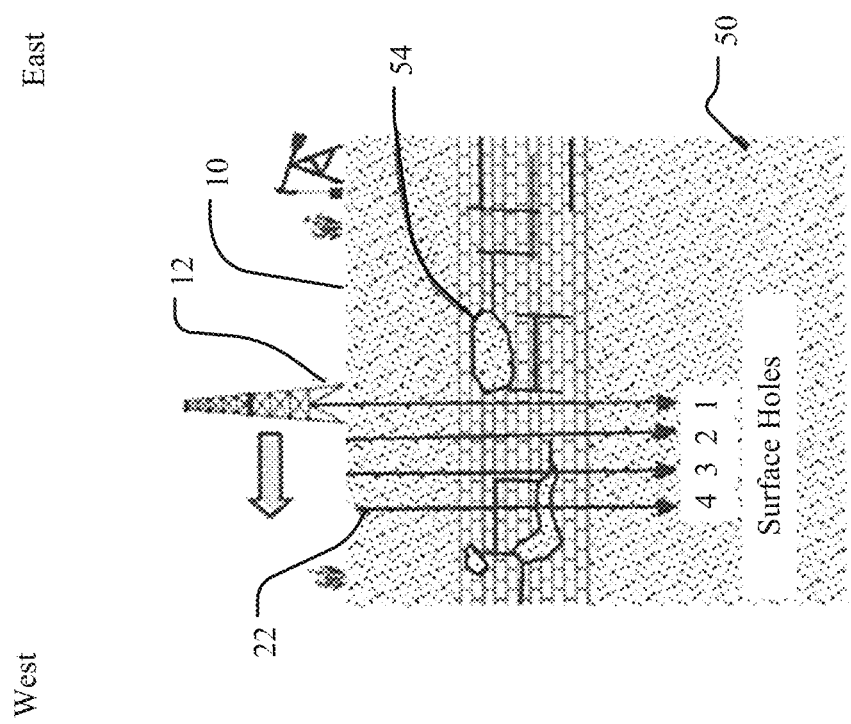
FIG. 2 is a detailed diagrammatic environmental view of an example subterranean formation having proposed wellbore locations disposed thereon.

Turning to FIG. 2, in one implementation, a drilling pad 20 is positioned on the earthen surface 10 based on the possible locations of the subsurface karsts 54. The drilling pad 20 may be positioned on the earthen surface 10 to form a plurality of wellbores 22 through the earthen surface 10 and into the subterranean formation 50.

The subsurface karsts 54 can vary over relatively short distances (e.g. 30 feet), such that when the plurality of wellbores 22 are planned in straight lines spaced between approximately 30 feet and 60 feet, the plurality of wellbores 22 can often encounter varying substrates including competent substrate and karst breccia. As can be appreciated in FIG. 2, in one example, the plurality of proposed wellbores 22 includes proposed wellbores 1 and 2, which can be formed through the subterranean formation 50 without intersecting with any of the subsurface karsts 54. However, proposed wellbores 3 and 4 of the plurality of wellbores 22 would pass through at least a portion of the subsurface karsts 54, which may adversely affect drilling operations, such that the drilling pad 20 may need to be relocated to another location. Such relocations may be costly in terms of time and resources during hydrocarbon production.

As such, the identification and detection of the subsurface karsts 54 is generated through surface mapping, air-borne gravity, three dimensional seismic data, and/or resistivity logs to assist in locating the drilling pad 20 to prevent the plurality of proposed wellbores 22 from encountering one or more of the subsurface karsts 54.

Figure 3B:
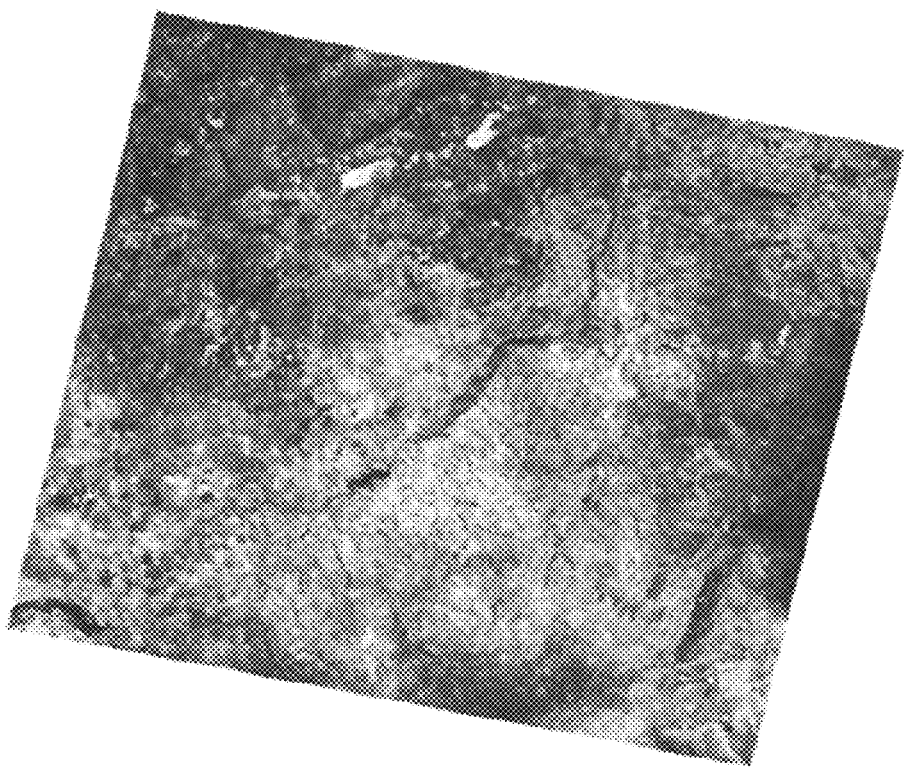
FIG. 3B is an example satellite image of an earthen surface in an infrared (IR) format.
Figure 3A:
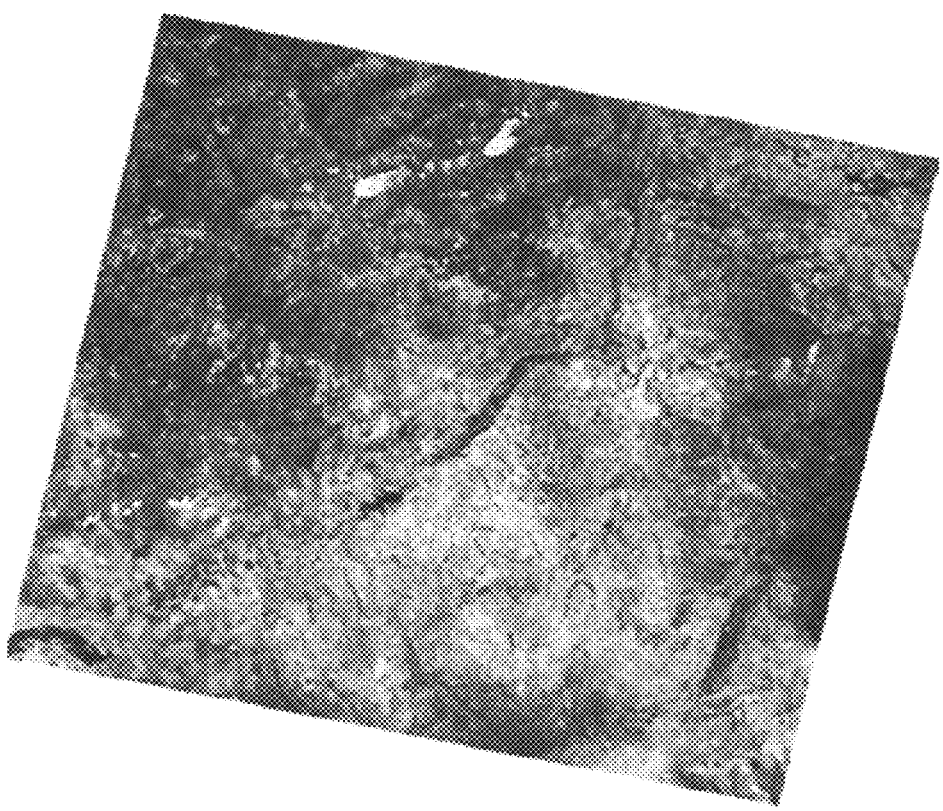
FIG. 3A is an example satellite image of an earthen surface in a natural colors view.
Figure 3C:
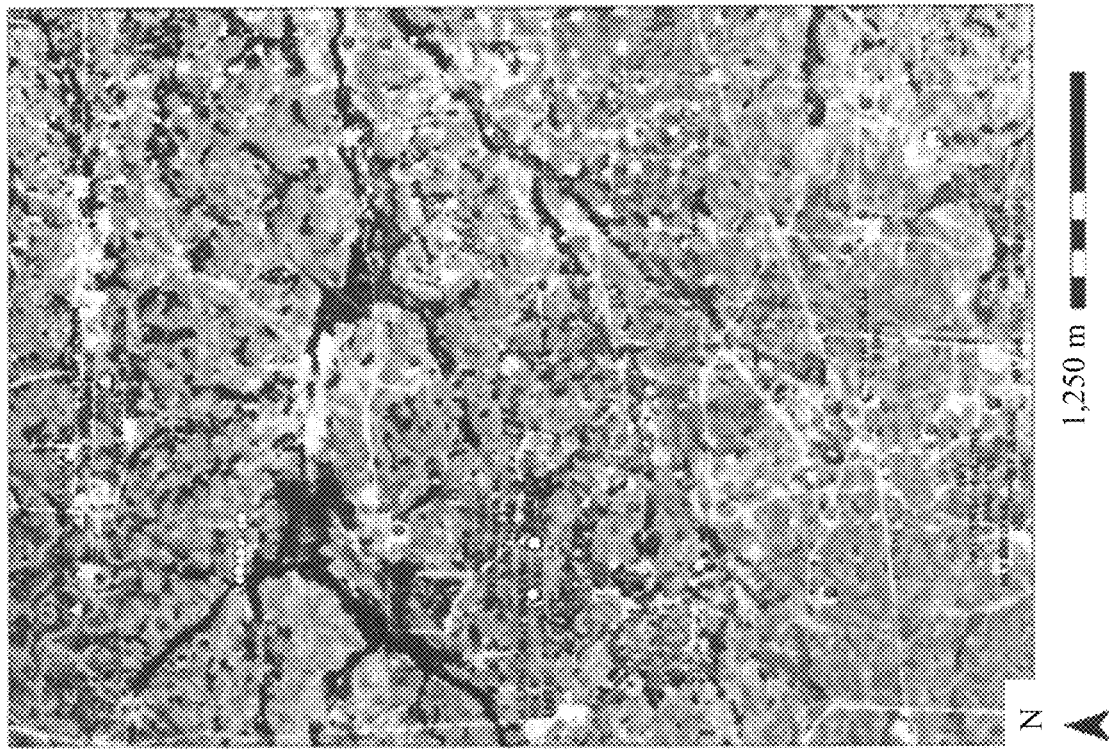
FIG. 3C is a diagrammatic view of an earthen surface enhanced using Principle Component Transformation.

As can be understood from FIGS. 3A-3C, in one implementation, the detection of subsurface karst features utilizes surfacing mapping including high resolution satellite, aerial, and/or drone imagery. For example, FIG. 3A illustrates a satellite image of an earthen surface of interest in full frame and natural colors format, while FIG. 3B illustrates a satellite image of the earthen surface of interest in a full frame IR format. Additionally, FIG. 3C illustrates a satellite image having a higher spatial resolution than FIGS. 3A and 3B. FIG. 3C has been image processed with a Principle Component Analysis to examine a proposed drilling location and enhance the surface karst features. In at least one example, FIGS. 3A-3C can be supplemented with aerial drone imagery to view proposed wellsite/pad infrastructure. A surface mapping of the proposed wellsite as provided by FIGS. 3A-3C can additionally include a high-resolution surface topography.

Figures 4A, 4B, 4C:
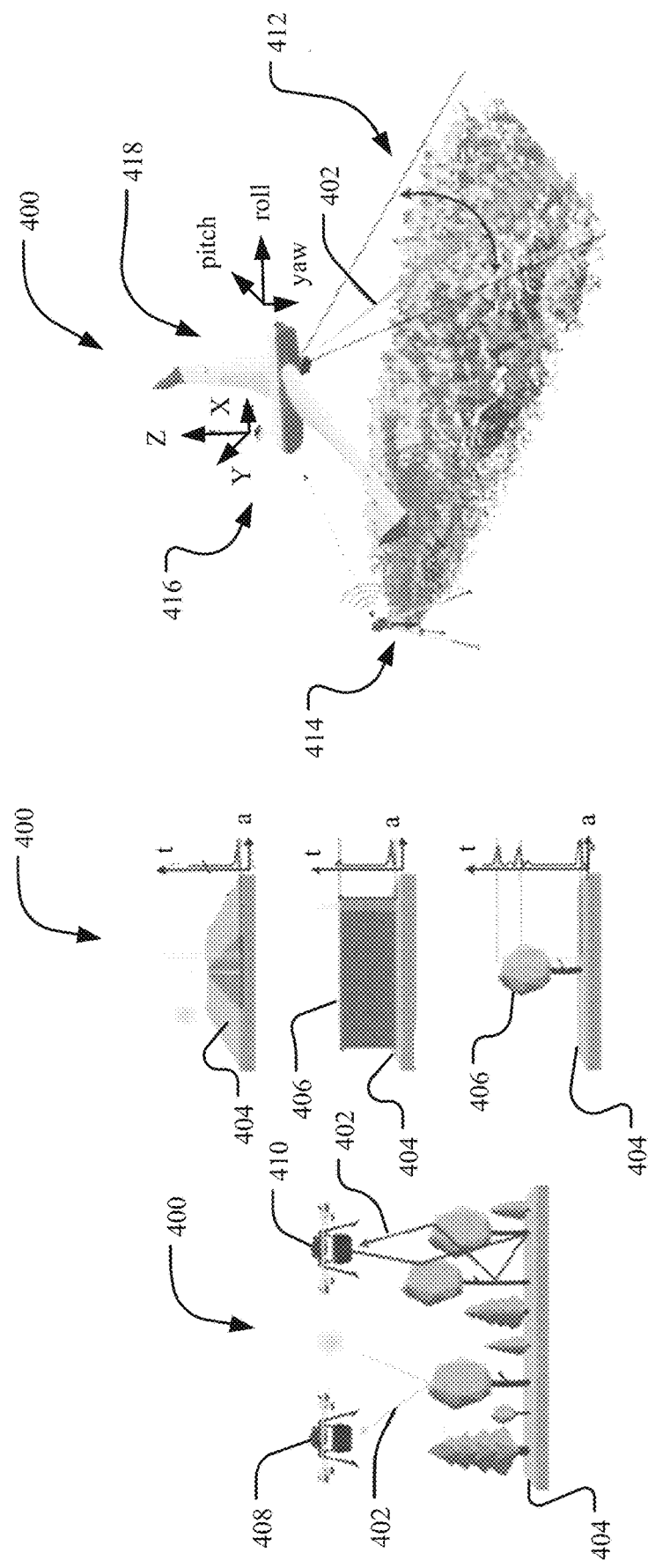
FIGS. 4A-C illustrate diagrammatic views of an example LiDAR arrangement.

Referring to FIGS. 4A-C, diagrammatic views of an example LiDAR system 400 is shown. The LiDAR system 400 can be implemented to generate very high resolution images of the proposed area of interest for drill pad/well site location.

In one implementation, the LiDAR system 400 can determine topography through the emission of a pulsed laser 402 and determination of emissions returns. As shown in FIG. 4A, where a passive sensor 408 is utilized to capture light, in some cases, vegetation and similar obstructions 406 prevent or otherwise limit the amount of data captured to the earth surface 404. However, an active sensor 410 may be utilized to emit the pulsed laser 402, such that it penetrates to the earth surface 404. As can be understood from FIGS. 4A-4B, where the earth surface 404 is bare or contains a uniform obstacle 406, only a single return is expected, while in the event of non-uniform obstacles 406, such as vegetation, multiple returns can be received (e.g., caused by the top of the vegetation, intermediate vegetation, and bottom vegetation). As shown in FIG. 4C, in one implementation, a GNSS reference station 414, a GNSS receiver 416, and an inertial measurement unit 418 may be used to control, navigate, and otherwise operate the LiDAR system 400 to capture topography of a location using a laser scanner 412.

Figure 5A:
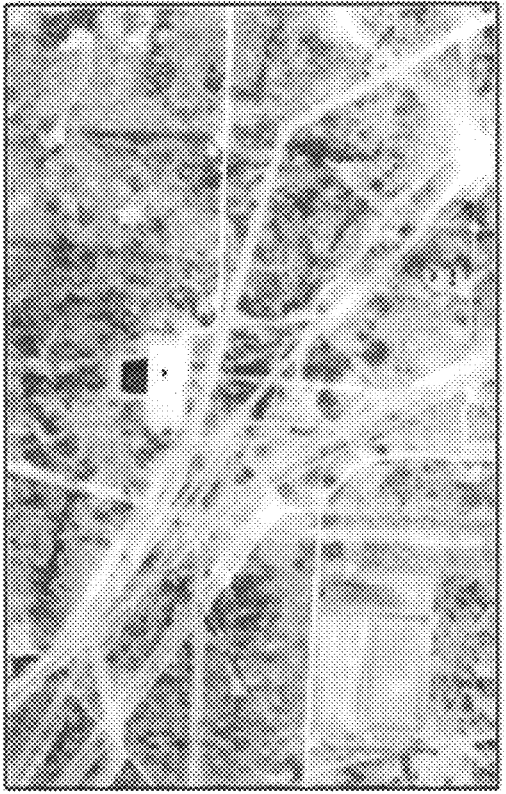
FIG. 5A is an aerial image of an example wellsite.
Figure 5B:
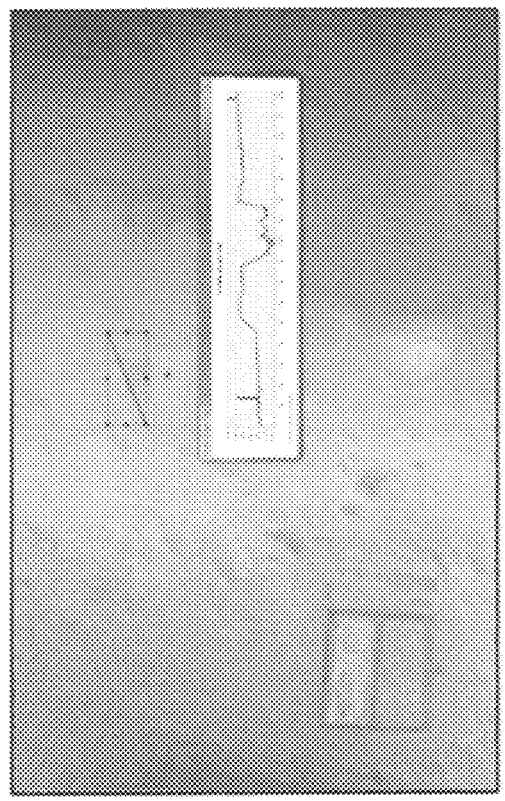
FIG. 5B is a shaded LiDAR topography with an example of detailed topographic profile extracted from a LiDAR data of the wellsite.
Figure 5C:
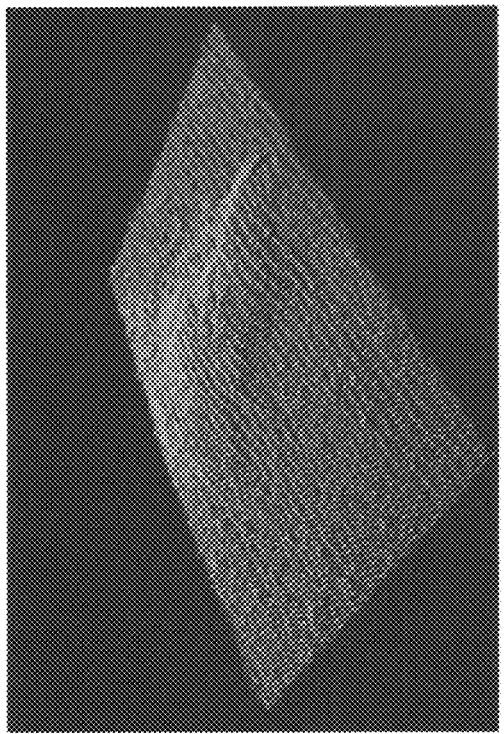
FIG. 5C is a 3D rendition of a point-cloud generated using the LiDAR data of the example wellsite.

FIG. 5A illustrates an aerial image of an example area of interest, while FIG. 5B illustrates a shaded LiDAR topography of the area of interest. FIG. 5C illustrates a 3D rendition of the point-cloud generated using LiDAR. The aerial imagery of FIGS. 3A-3C along with the LiDAR imagery of FIGS. 5B and 5C can assist in the identification of surface karst features within the area of interest.

Figures 6A, 6B:
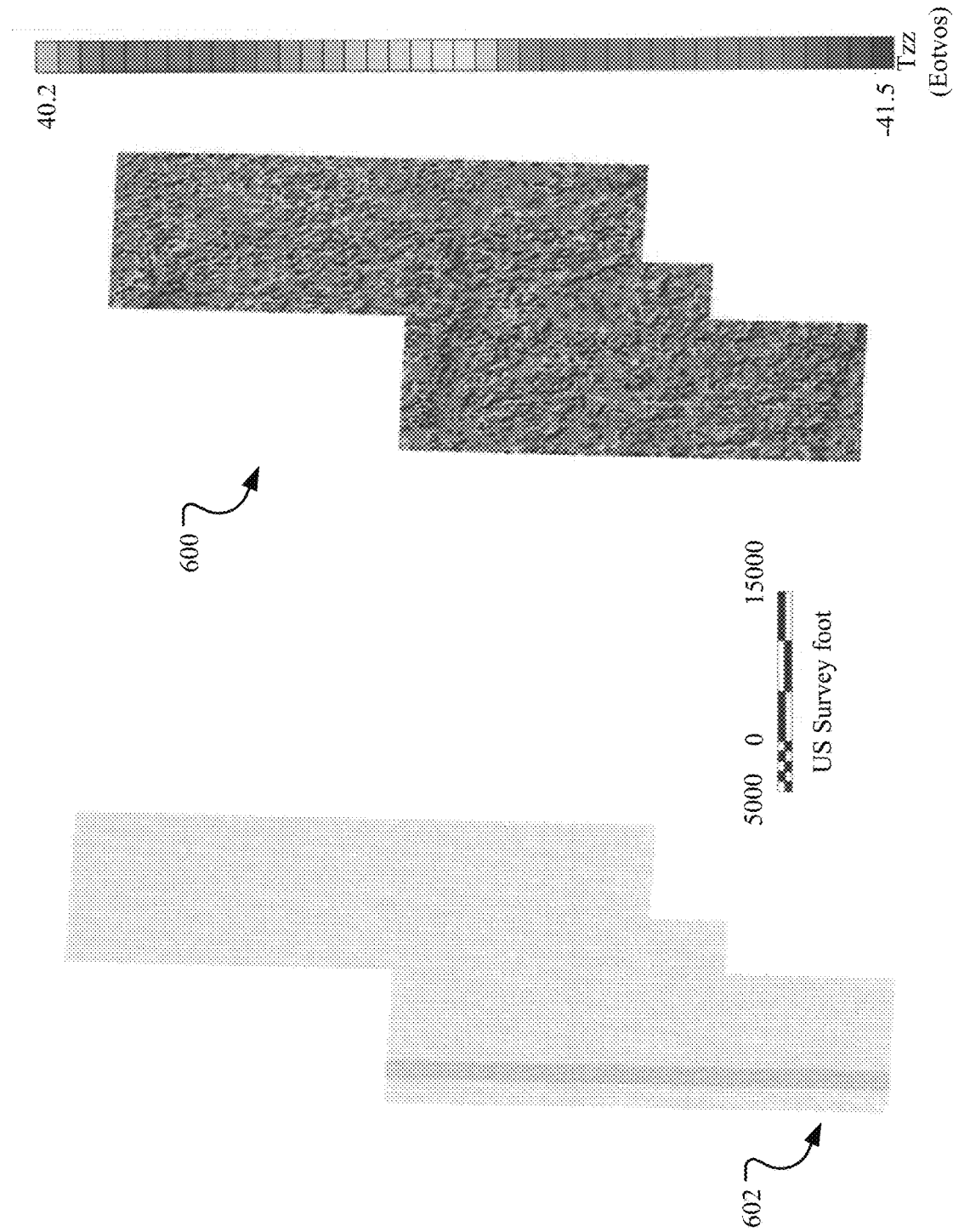
FIG. 6A is an illustrative diagram of flight lines of air-borne gravity data of an example wellsite.
FIG. 6B is an illustrative diagram of a hill shaded image of air-borne gravity data of an example wellsite.

FIG. 6A illustrates example flight lines of an air-borne gravity data, while FIG. 6B illustrates a hill shaded image of example air-borne gravity data. In one implementation, the airborne gravity data 600 is acquired via a plurality of flight lines 602 flown at a predetermined altitude. The airborne gravity data 600 can be implemented with Curvature analysis of the ZZ tensors field data, thus providing qualitative analysis of subsurface karst features, as shown for example in FIG. 6C.

Figure 7:
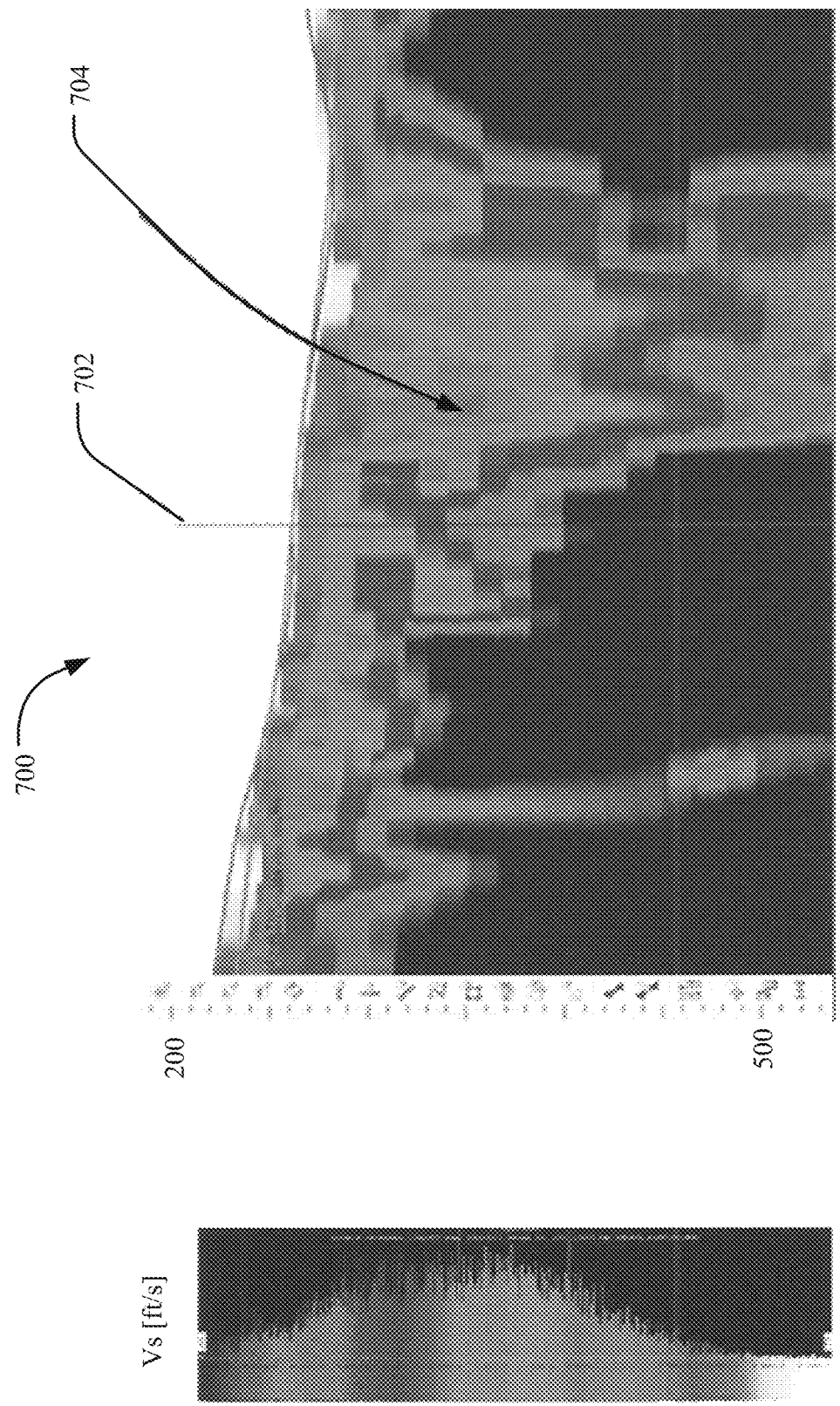
FIG. 7 is a seismic profile of an example wellsite illustrating one or more karst features.

Turning to FIG. 7, a three-dimensional (3D) seismic data set of an example area of interest is illustrated. Land seismic data may be obtained for an area of interest; however, due to acquisition settings, the seismic reflection data is too deep for karst detection. More particularly, most land seismic data observes compressional seismic data at around 2,500 feet, while subsurface karsts are generally present less than 1,000 feet in depth. The land seismic reflection data is thus not applicable in shallow karst detection. However, velocity profiles predicted from ground roll noise along show lines and receiver lines can be utilized for karst detection as described herein. A subsurface karst feature filled with air, for example, has a very low velocity compared to very high background carbonate velocity in a subterranean formation.

During land seismic data acquisition, ground roll data may be recorded together with reflection data. The ground roll data is generally treated as noise and thus disregarded during seismic processing. The ground roll data can be processed and inverted for shear wave velocity to assist in identifying and detecting subsurface karst features. The spacing between shot lines and receiver lines in acquired seismic data is normally too large for well placement determination if the seismic line is not located close enough to the proposed wellsite and/or wellbore locations.

Accordingly, as can be appreciated in FIG. 7, in one implementation, a seismic data log 700 is provided along one of the seismic shot lines. A proposed well 702 is projected over the seismic data log 700. The seismic data log 700 illustrates an inverted ground roll data for shear wave velocity, which is generally low in the unconsolidated/reworked rock layer between 10 and 25 feet of depth. Within a few hundred feet from the proposed well 702, there is a velocity anomaly 704 where low velocity (~3000 ft/s) is surrounded by higher velocity (~4500 ft/s). The velocity anomaly 704 is identified as a subsurface air-filled karst feature, and flagged as a potential drilling hazard for further evaluation by resistivity data, discussed below with respect to FIGS. 8, 9A, and 9B.

Figure 6C:
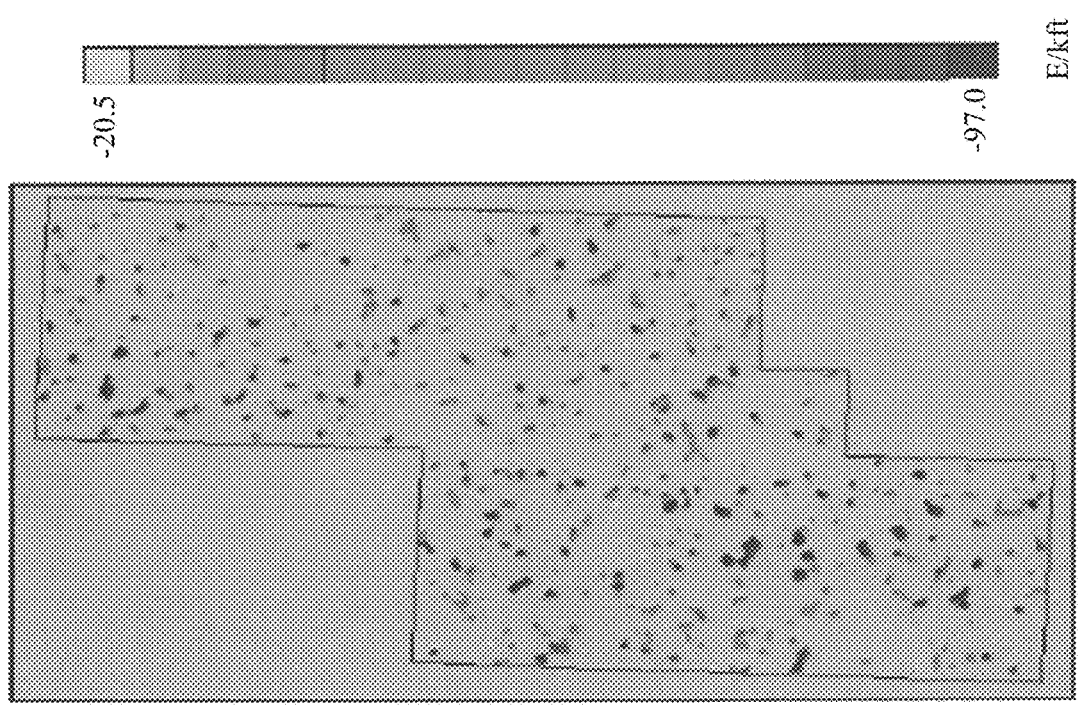
FIG. 6C is an illustrative diagram of curvature data of an example wellsite.
Figure 8:
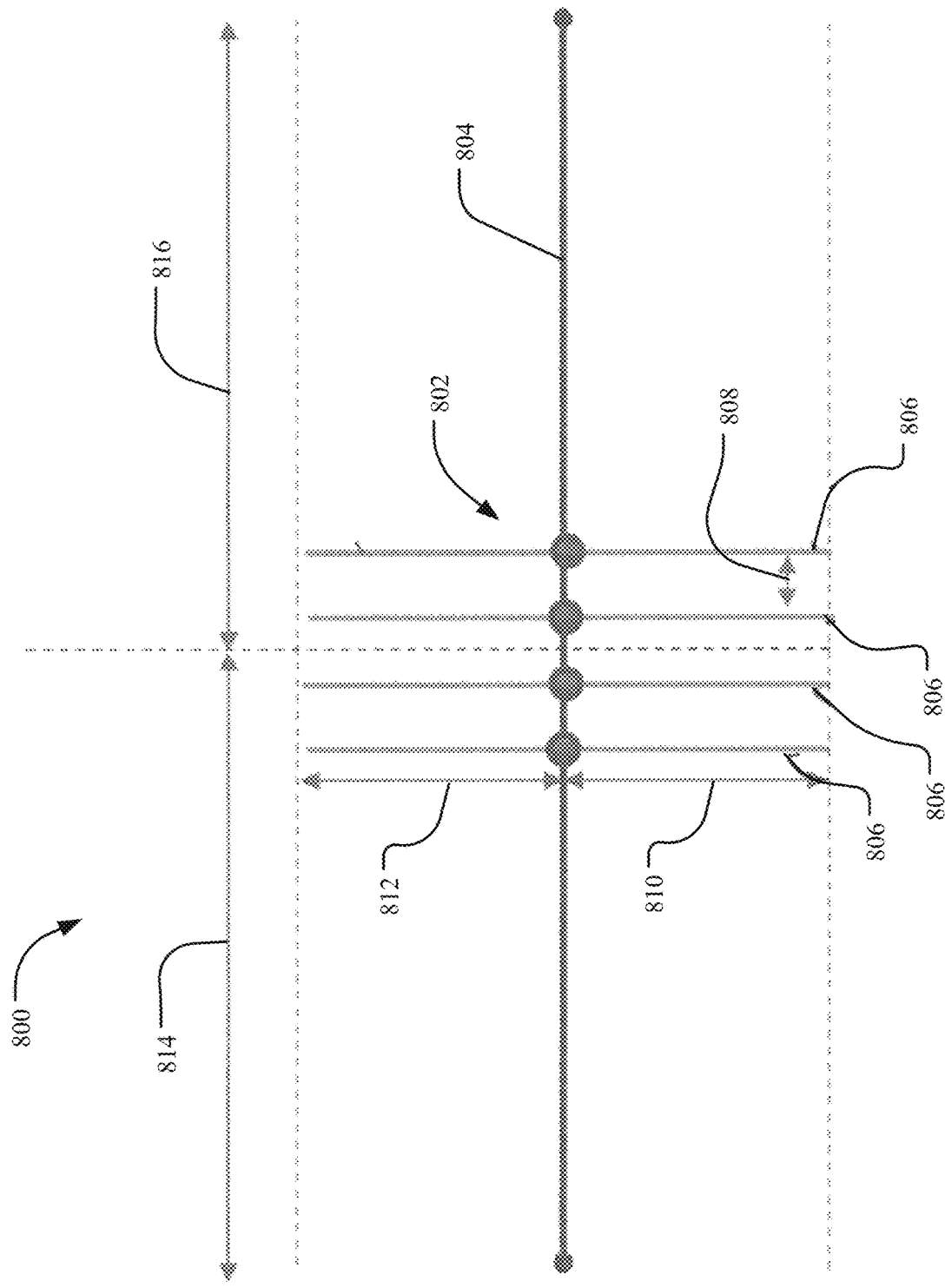
FIG. 8 is a diagrammatic view of an example resistivity surface.

FIG. 8 illustrates a diagrammatic view of an example resistivity survey design 800. While airborne gravity data, such as that illustrated in FIGS. 6A-6C, provides a regional view of a possible subsurface karst feature and cavern anomalies, the spatial resolution may be insufficient to determine a drilling location without risk of subsurface karst interaction. As such, the resistivity survey design 800 is generated accordingly.

In one implementation, the resistivity survey design 800 includes a quad pad determining proposed well locations 802 (e.g. four surface hole locations) positioned at a desired drilling location. The resolvable depth for subsurface anomalies is directly related to a length of line. Longer lines can achieve deeper penetration into the ground but at less vertical resolution. Thus, to obtain optimized inverted results, resistivity lines of the resistivity survey design 800 include a consistent azimuth and spacing between electrodes.

In one example, a long line 804 can have a plurality of electrodes (e.g., 112 electrodes) centered based on the proposed well locations 802. The electrodes can be spaced approximately 18.5 feet apart, for example. To achieve a deeper depth of penetration, an additional electrode may be added at the end of the long line 804. This electrode may be placed approximately 2,000 feet from the line end. The pole-dipole setting generates a deeper depth of investigation, while maintaining currency throughout the entire electrode string. Short lines 806 may have a second plurality of electrodes (e.g., 56 electrodes) disposed thereon. The short lines 808 can be centered at proposed well locations and have electrodes spaced approximately 18.5 feet apart. The spacing between adjacent short lines 806 can be equal to or less than the spacing between proposed surface hole locations. In one examples, a spacing 808 may be approximately 25 feet, depths 810 and 812 may each be approximately 509 feet, and lengths 814 and 816 may be approximately 1027 feet. However, other proportions are contemplated.

In some instances, high resolution aerial imagery (for example, satellite imagery obtained in FIGS. 3A-3C) can be implemented to assist in the layout of the resistivity lines. Impact of possible existing obstacles are further taken into account, including, but not limited to, existing drilling pads (and material thereof), roads, rock piles, facilities (e.g. metal pipes), mud and/or water pits, and the like. Surveying equipment may be utilized to establish line and positioning of each probable location, and end points of each resistivity line may be determined using GPS equipment, for example.

Figure 9A:
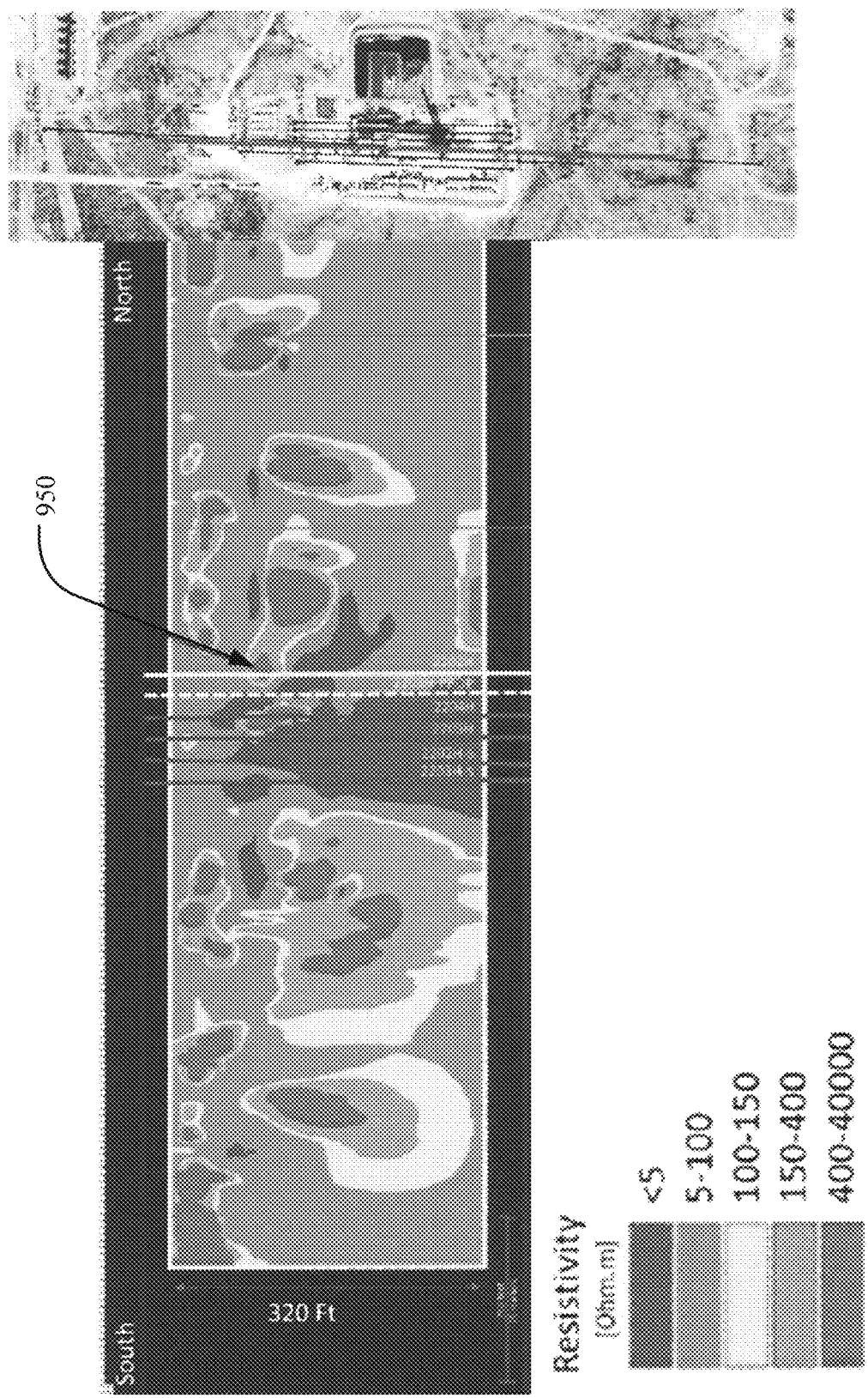
FIG. 9A is an example resistivity profile in a north-south direction 25 feet west of example wellbore locations.
Figure 9B:
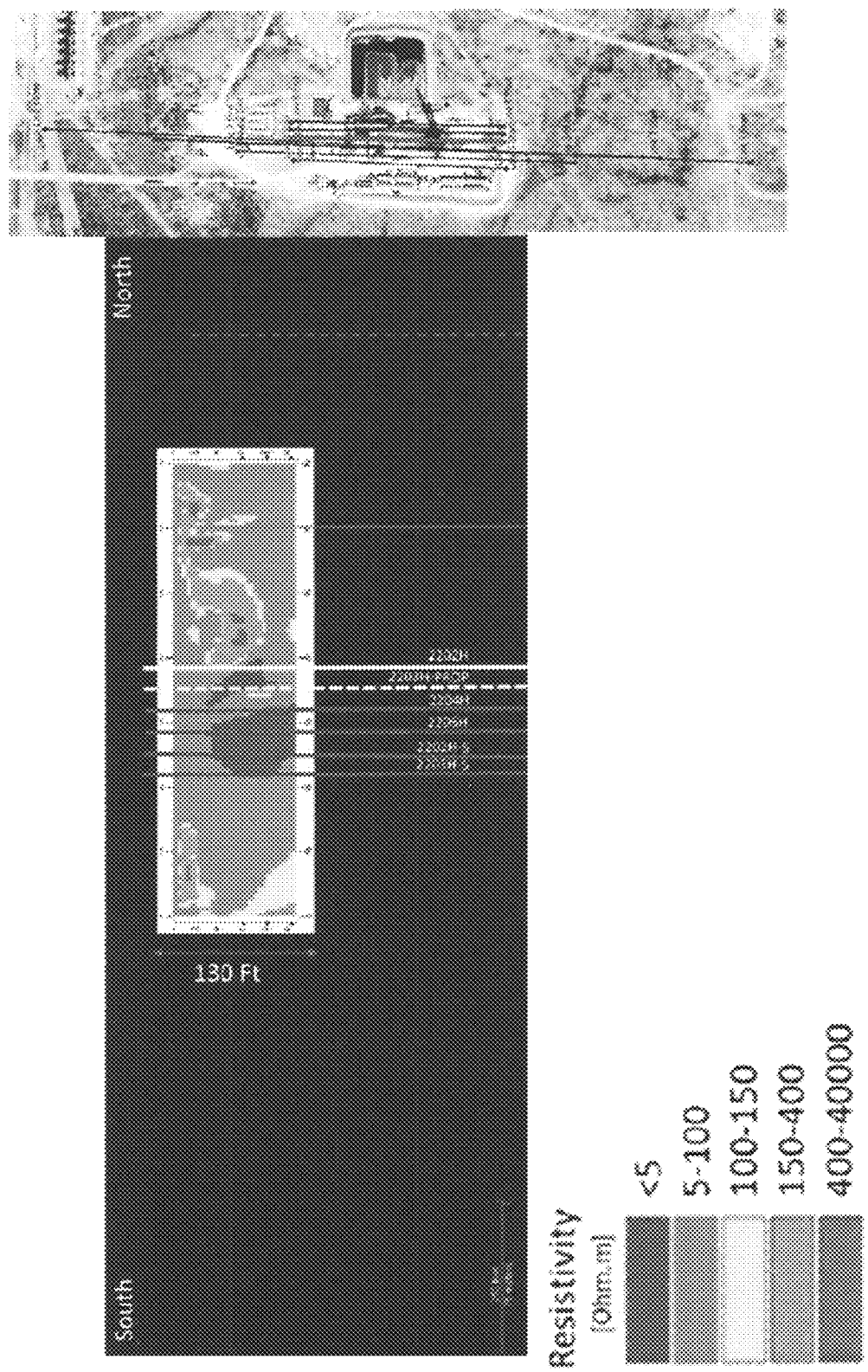
FIG. 9B is an example resistivity profile in a north-south direction 25 feet east of example wellbore locations.

Turning to FIG. 9A, an example one dimensional resistivity profile for a wellsite is illustrated, with the resistivity profile detailing 25 degrees west of proposed well locations. FIG. 9B illustrates another example one dimensional resistivity profile for a wellsite, with the resistivity profile detailing 25 degrees east of proposed well locations. The resistivity profiles illustrate data collected according to a resistivity survey, such as the resistivity survey design 800. In the example of FIGS. 9A-9B, the resistivity survey design 800 generating the resistivity profiles may include a long line that positions 112 electrodes with approximately 10 feet of spacing between them and spacing between adjacent short lines set at approximately 25 feet.

As in the illustrated in FIGS. 9A and 9B, a well location is placed and encounters a subsurface karst 950. The subsurface karst 950 can cause drilling fluid loss, thus requiring abandonment and plugging of the well. The subsurface karst 950 is detailed by the high resistivity feature being filled partially or completely with air. However, as can be appreciated in FIGS. 9A and 9B, other well locations are positioned and arranged to prevent encounter with any high resistivity features, such as subsurface karst features. While the well location is shown in FIG. 9A as encountering a high resistivity feature at approximately 100 feet in depth, this feature is not present on FIG. 9B, meaning that the feature is likely not to intersect the actual well location due to size of the potential karst feature and direction of the well location.

In one example, where the resistivity is 5 Ohm-meters or less, it may indicate a karst filled with brine water or casing effect, while a resistivity of between 5-100 Ohm-meters indicates background subterranean formation with no karst present. A resistivity of between 100-150 Ohm-meters may indicate a transitional area that is less likely to have karst. On the other hand, a resistivity of between 150-400 Ohm-meters indicates karst filled with sediment and partially air, and a resistivity of 400-40,000 Ohm-meters indicates a karst filled with air.

FIGS. 9A and 9B detail how a relatively small difference in surface hole location and wellsite positioning may impact whether subsurface karst features are encountered. Significant relocation of a proposed wellsite may not be needed in response; however, strategic positioning of the well locations can prevent encountering subsurface karsts, thus requiring abandonment of one or more wellbores and determining new proposed wellsite locations.

Figure 10:
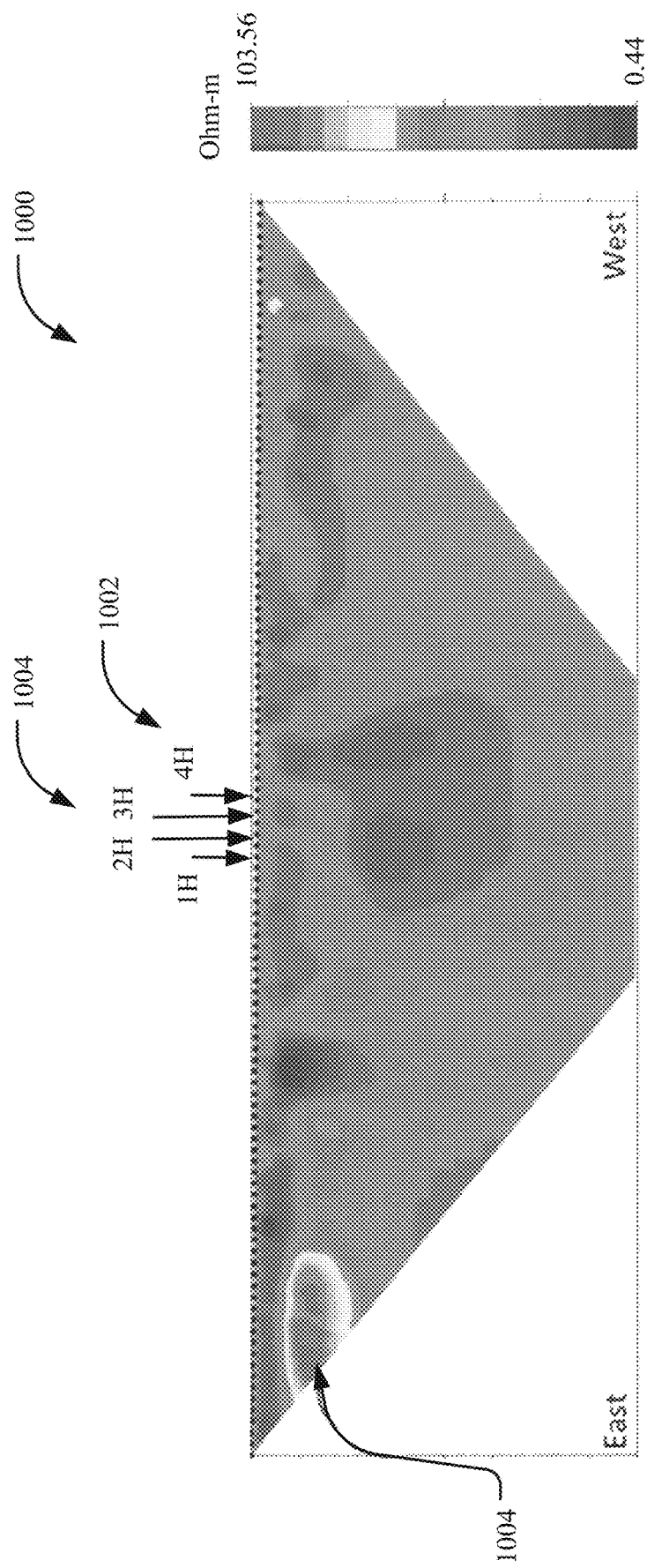
FIG. 10 is an example resistivity profile of one or more proposed wellbore locations.

Turning to FIG. 10, an example resistivity profile 1000 through a proposed wellsite with one or more planned wellbores is shown. The resistivity profile 1000 can be generated by a resistivity survey design, such as detailed with respect to FIG. 8, with a single long line and four short lines arranged over a proposed pad location 1002 for one or more wellbores 1004.

In one implementation, a long resistivity line can be placed in an East-West direction, such that the long line passes through each of the surface locations of the one or more wellbores 1004. Short resistivity lines can be placed in a North-South direction, while intersecting the long resistivity line at the surface locations of the one or more wellbores 1004. The spacing between adjacent wellbores of the one or more wellbores 1004 can be approximately 35 feet, for example.

In at least one instance, a distal electrode can be added approximately 2,000 feet from the end of the long resistivity line. While the FIG. 10 illustrates a distal electrode at approximately 2,000 feet, it is within the scope of this disclosure to place a distal electrode at any distance away from the end of the long resistivity line including, but not limited to, 100 feet, 1,000 feet, 5,000 feet, any distance therebetween, or any other distance operable to improve the resistivity profile. The pole dipole setting can increase the depth of penetration to approximately 600-700 feet, which provides sufficient coverage for exploring karst features in a subterranean formation area.

As can be appreciated in FIG. 10, the resistivity profile 1000 details a single subsurface karst feature 1006 on the Eastern end of the line and away from the proposed one or more wellbores 1004. The subsurface karst feature 1006 has a resistivity reading exceeding 10,000 Ohm per meter, which indicates a likely air-filled karst feature. Thus, the proposed pad location 1002 is appropriate as the one or more wellbores placed therein are unlikely to encounter drilling disruptions caused by subsurface karst features 1006.

Figure 11:
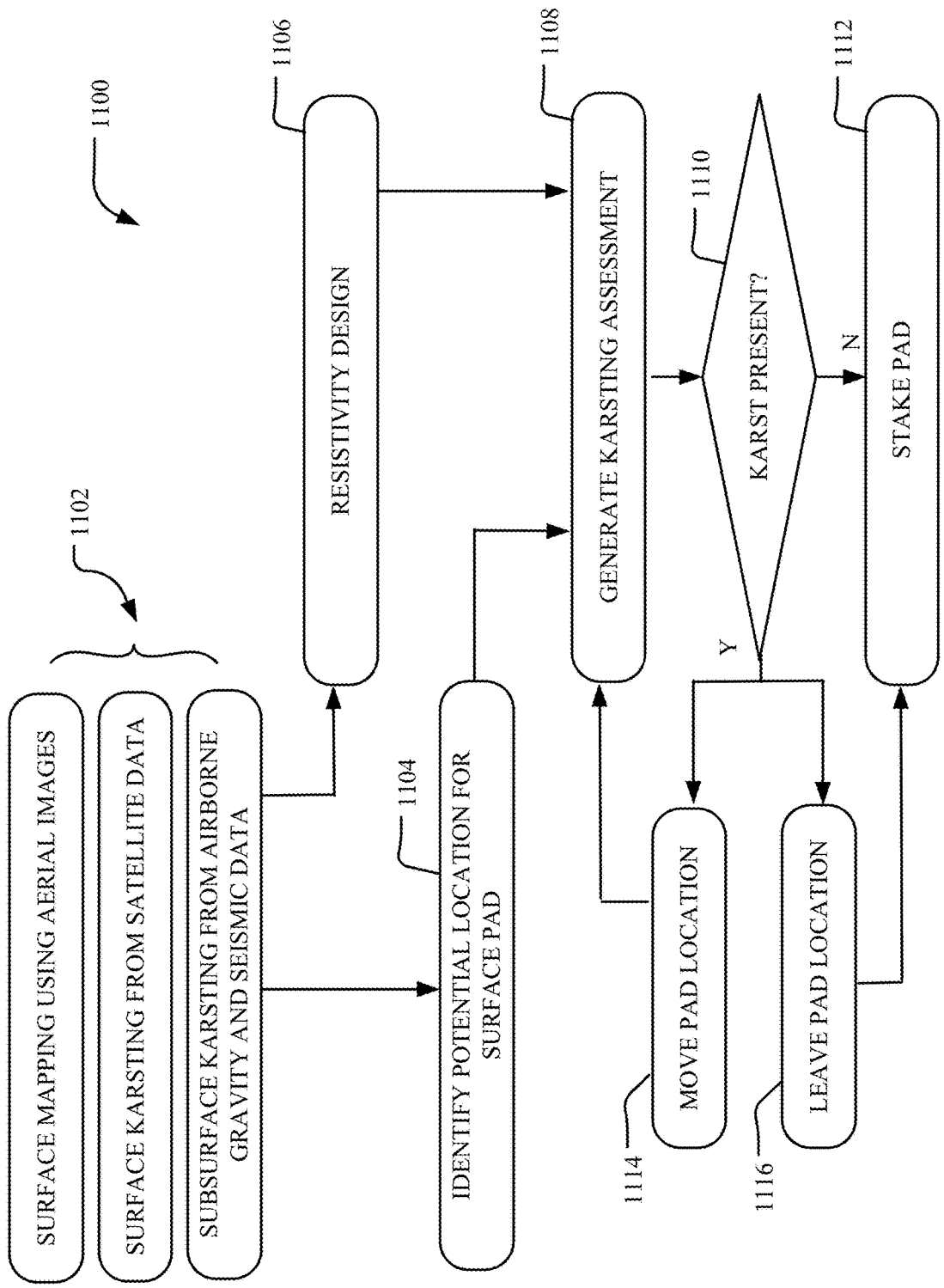
FIG. 11 illustrates example operations for detecting and/or avoiding one or more subsurface karsts within a wellsite.

FIG. 11 illustrates example operations 1100 that may be implemented with respect to the systems and devices, as described with respect to FIGS. 1-10. While the method 1100 is shown and described with respect to operations 1102-1116, it is within the scope of this disclosure to implement any number of operations, including omission of one or more operations or inclusion of additional operations not specifically described with respect to the operations 1100. Further, while operations are described sequentially, no specific order is implied nor required.

In one implementation, an operation 1102 acquires surfacing mapping, surface karsting, and/or subsurface karsting data sets. The system can receive surface mapping using aerial images, and surface karsting data from satellite data and related imagery. The system can also receive subsurface karsting data from airborne gravity and seismic data.

An operation 1102 identifies a potential surface drilling pad location within the area of interest. The potential surface pad location can be placed based at least in part on the surface mapping, aerial surface karsting, and/or airborne gravity subsurface karsting. An operation 1104 defines a resistivity design for the area of interest. The resistivity design can be based at least in part on the surface mapping, aerial surface karsting, and/or airborne gravity subsurface karsting. In one implementation, the resistivity design can be determined in view of the potential surface pad location for one or more wellbores.

In one implementation, an operation 1106 generates a resistivity survey for the area, and an operation 1108 generates a karst assessment for the area of interest to detect and identify potential subsurface karsts present adjacent to the potential surface pad location and/or one or more potential wellbores formed at the potential surface pad location. An operation 1110 determines whether one or more subsurface karst features are present. The one or more subsurface karst features can identified and detected to determine their location within the area of interest including whether one or more of the proposed wellbores formed from the potential surface pad location would intersect any of the one or more subsurface karst features. Additionally, the size, shape, and overall resistivity of the subsurface karst feature can further determine the placement of one or more of the wellbore locations.

If the operation 1110 identifies any karst features, an operation 1114 moves the proposed surface pad location. The system can determine the one or more subsurface karst features will be intersected by one or more of the proposed wellbore, thus leading to drilling operation issues. Moving the surface pad location, even small distances any one or more directions can be achieved to prevent wellbores from intersecting one or more subsurface karst features. The operation 1108 may be repeated to generate a new resistivity survey at the newly selected surface pad location.

If the operation 1110 identifies any karst features, an operation 1116 leaves the proposed surface pad location despite of the presence of one or more subsurface karst features. The proposed surface pad location and the one or more proposed wellbores therewith may be arranged so that they do not intersect or interact with the identified and detected one or more subsurface karst features. In this instance, movement of the proposed surface pad location in one or more directions may increase the likelihood of intersecting one or more subsurface karsts.

Where the operation 1110 determines that no potential karst features are present, an operation 1112 stakes the proposed surface pad location. The proposed surface pad location can be staked and prepared for the formation of one or more wellbores therein.

In various examples, different types of karst may be identified while drilling using the presently disclosed technology, with some wellsites being relocated based on the identifications to avoid an encounter with the karst. In a series of specific examples, air-filled karst were detected during drilling with two wells being relocated in one example, air-filled karst were detected during drilling with four wells being relocated in another example, partial air-filled and air-filled karst were identified and with 24 wells being relocated in another example, partial air-filled and air-filled karst were identified and with 17 wells being relocated in another example, and sediment filled, air-filled, partial air-filled, and/or other karst types were identified in other examples where the wells were not drilled, the proposed wells were safe distances from the karst features, or the wells were drilled with caution. In this series of examples, a total of 47 wells were relocated and 135 operation days were saved.

Figure 12A:
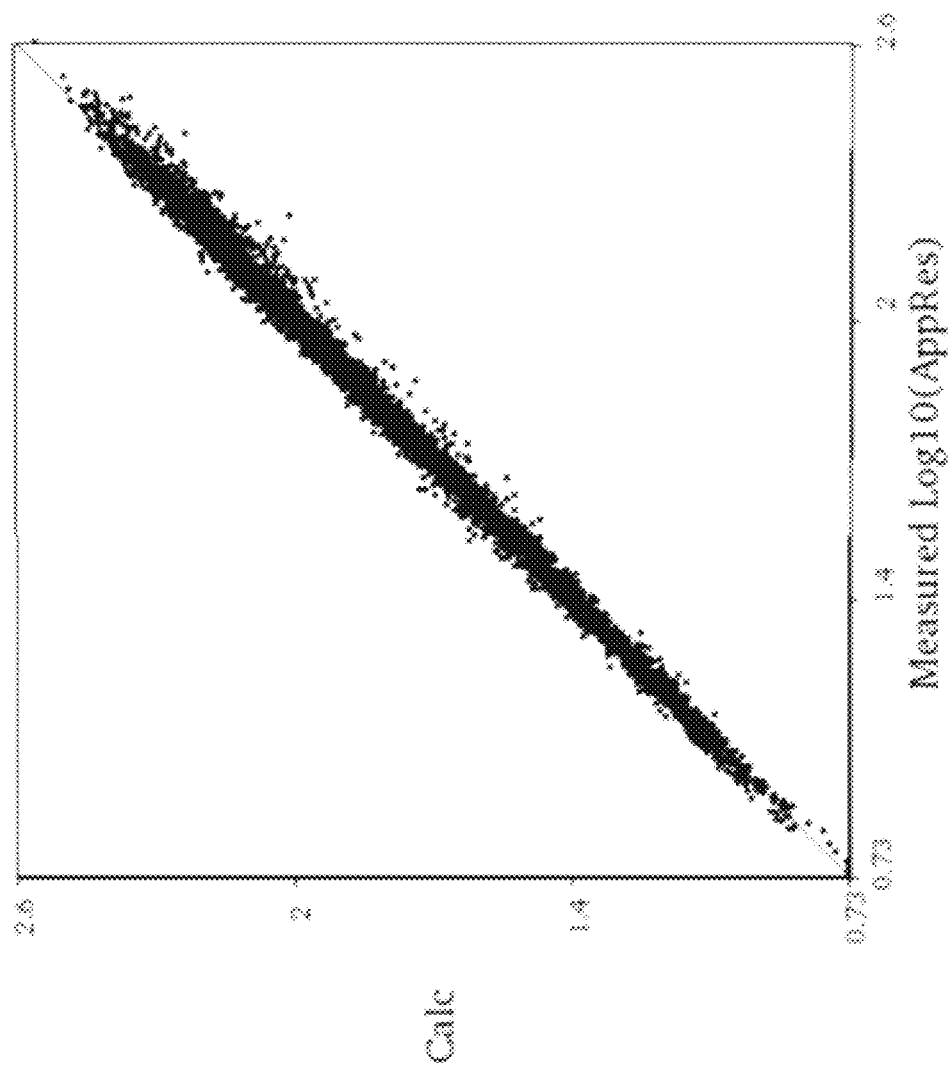
FIG. 12A depicts an apparent resistivity crossplot for an example wellsite.
Figure 12B:
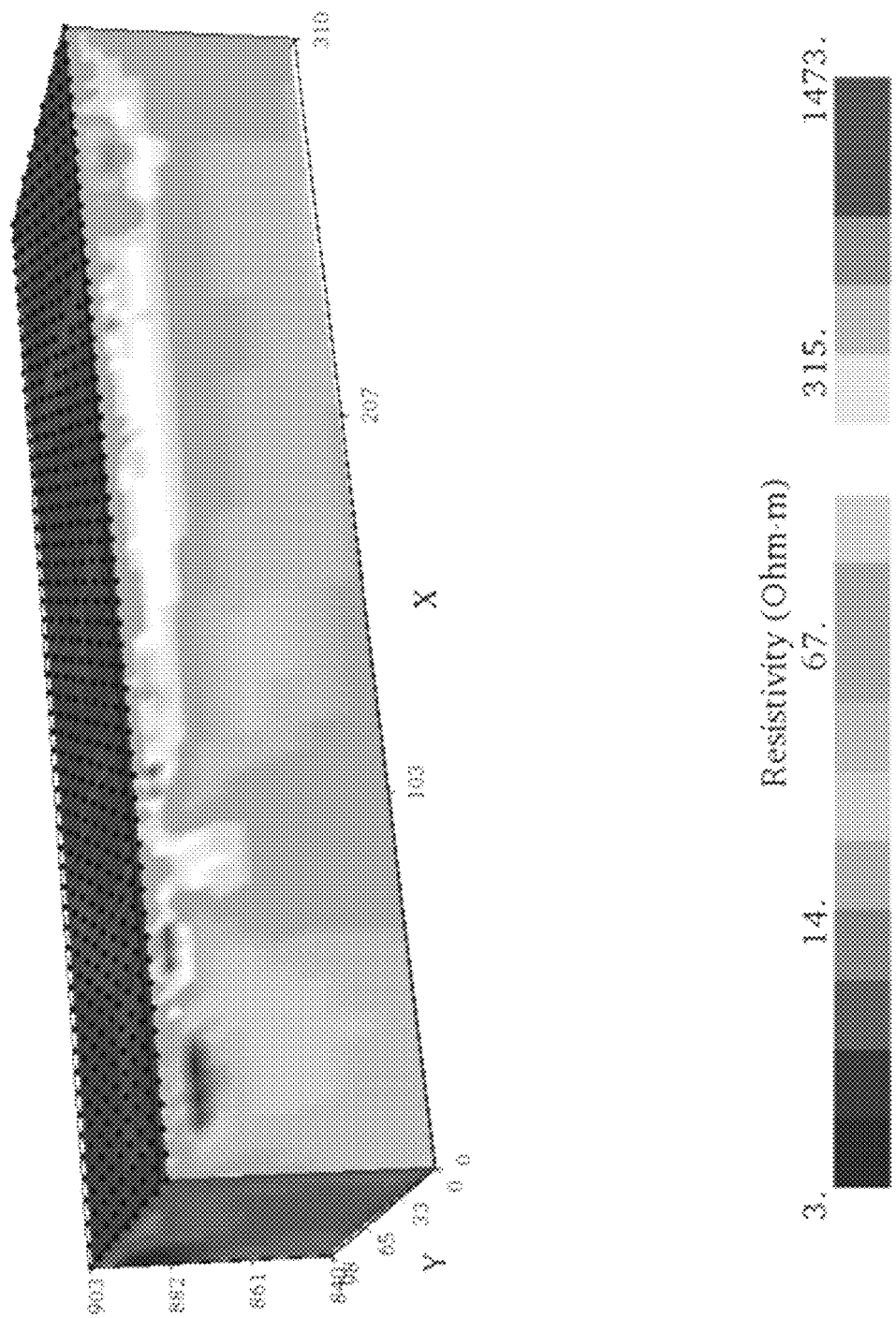
FIG. 12B shows an inverted resistivity image for the example wellsite.
Figure 12C:
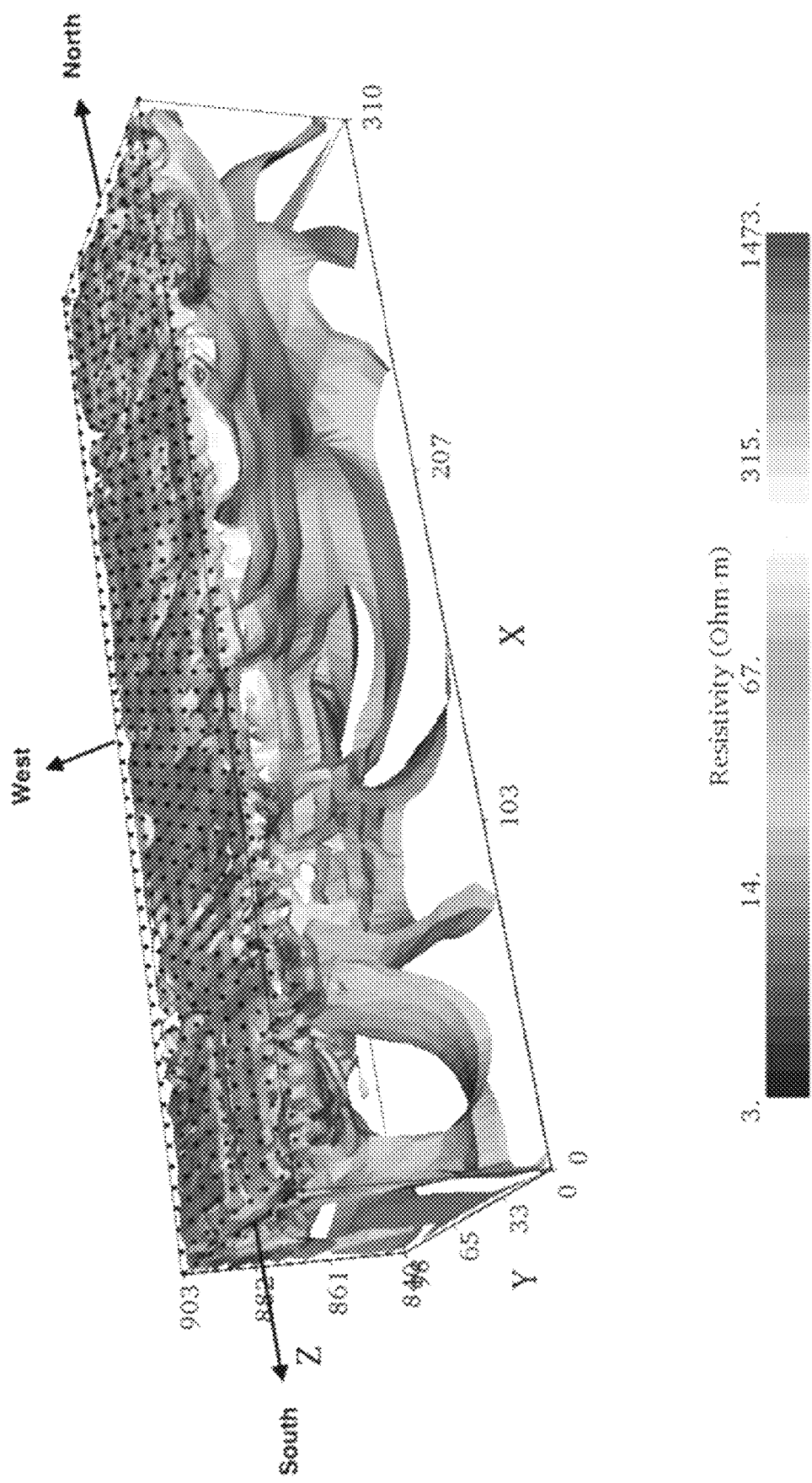
FIG. 12C illustrates a 3D resistivity contour plot of the example wellsite.
Figure 12D:
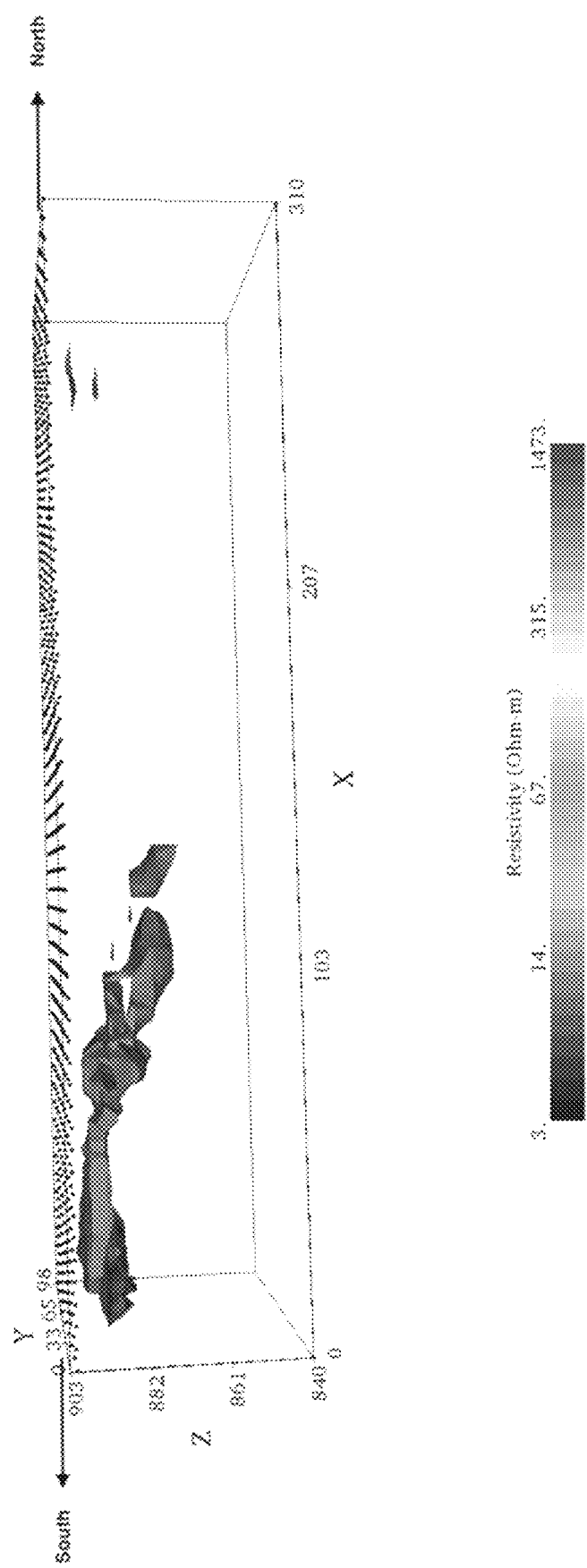
FIG. 12D shows another 3D resistivity contour plot of the example wellsite, focused on zones that are less than 10 ohm-meters.
Figure 12E:
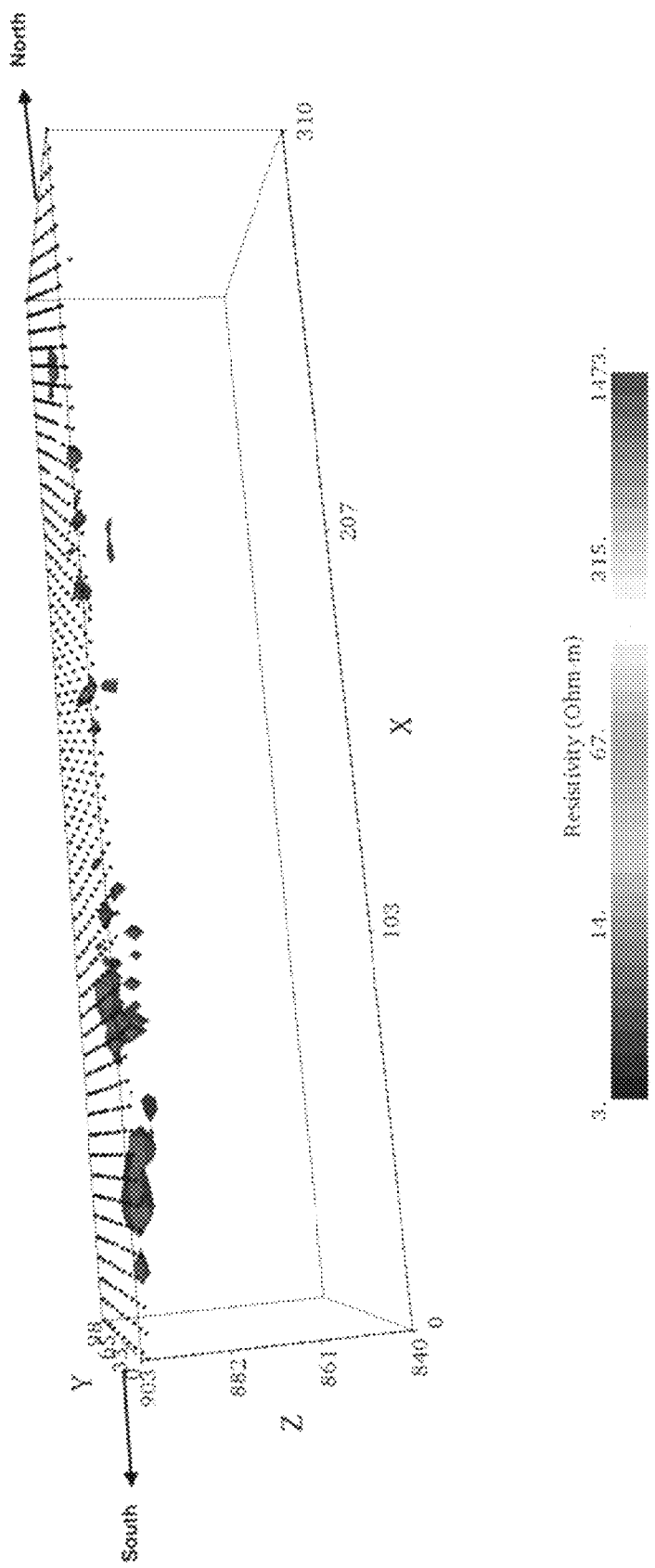
FIG. 12E shows another 3D resistivity contour plot of the example wellsite, focused on zones that are greater than 1000 ohm-meters.
Figure 12F:
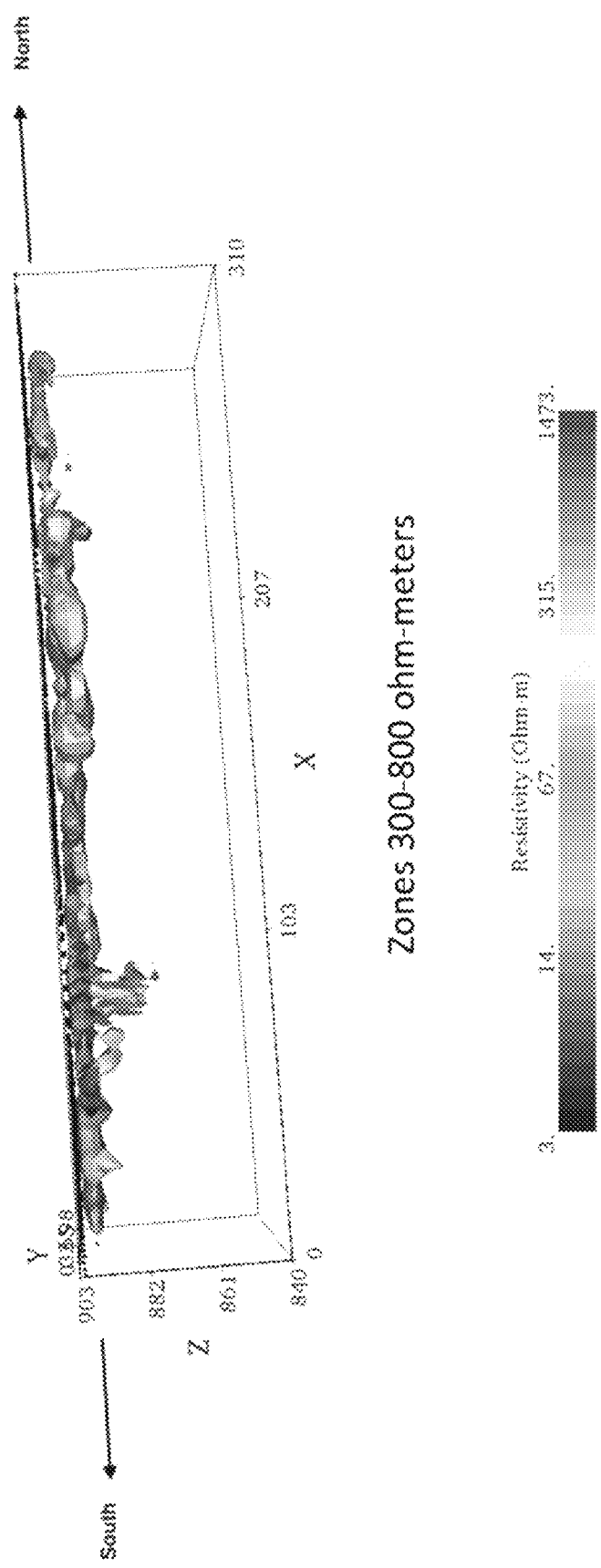
FIG. 12F shows another 3D resistivity contour plot of the example wellsite, focused on zones that are between 300-800 ohm-meters.
Figure 12G:
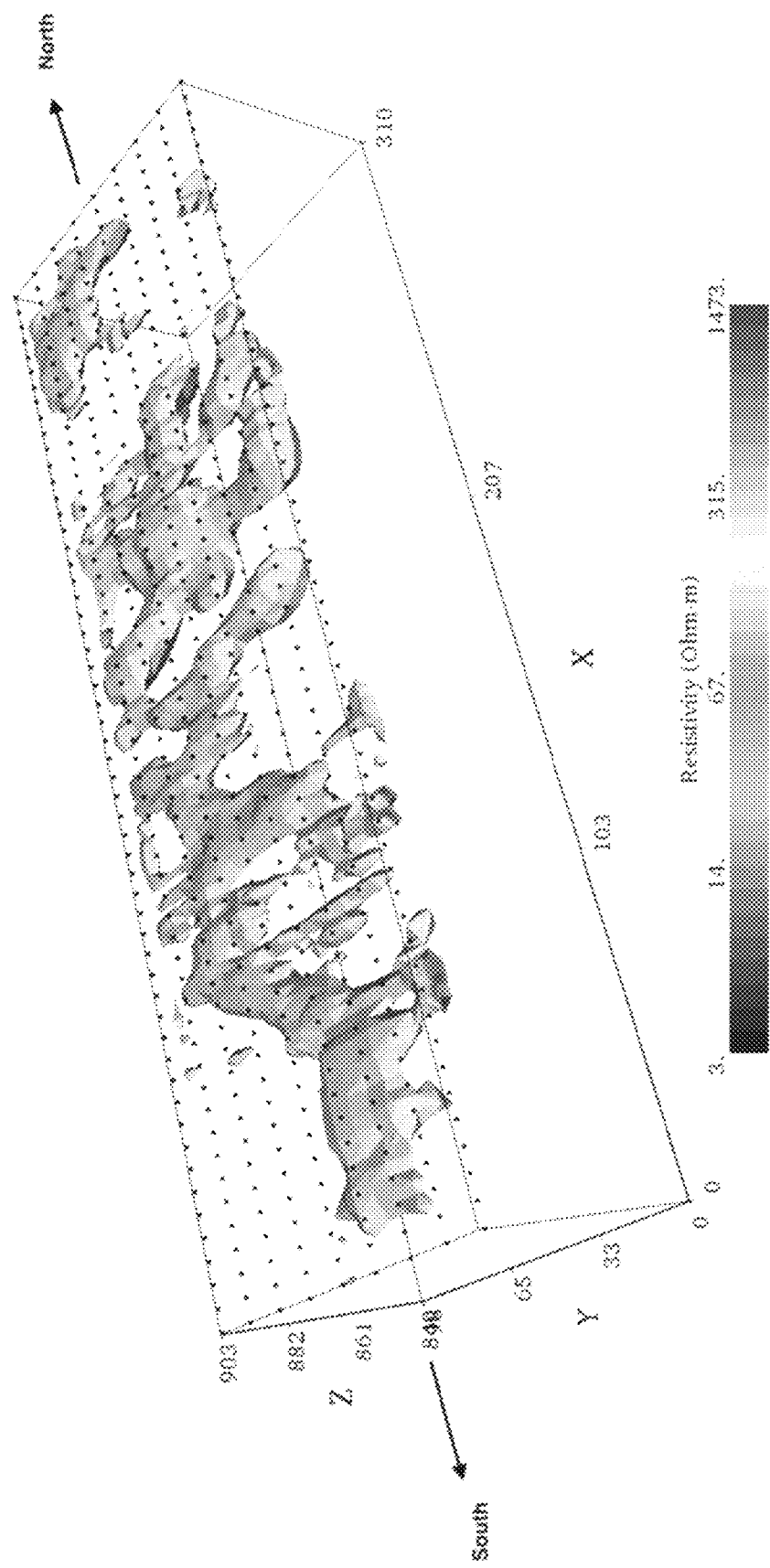
FIG. 12G shows another view of the 3D resistivity contour plot of the example wellsite, focused on the zones that are between 300-800 ohm-meters.
Figure 13A:
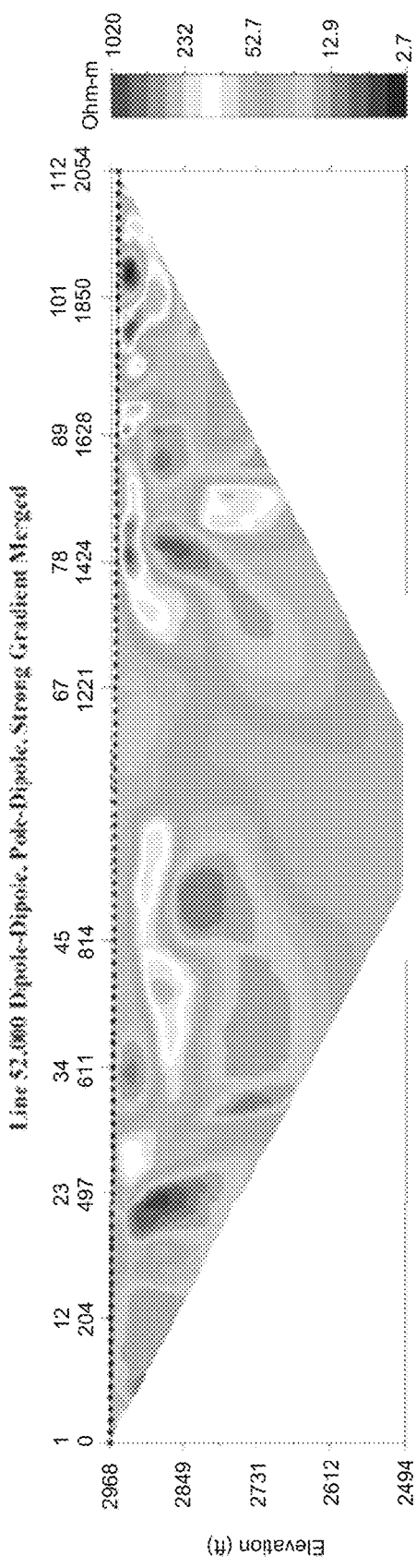
FIG. 13A illustrates an example 2D resistivity profile for long line 1 of the example wellsite of FIGS. 12A-12G.
Figure 13B:
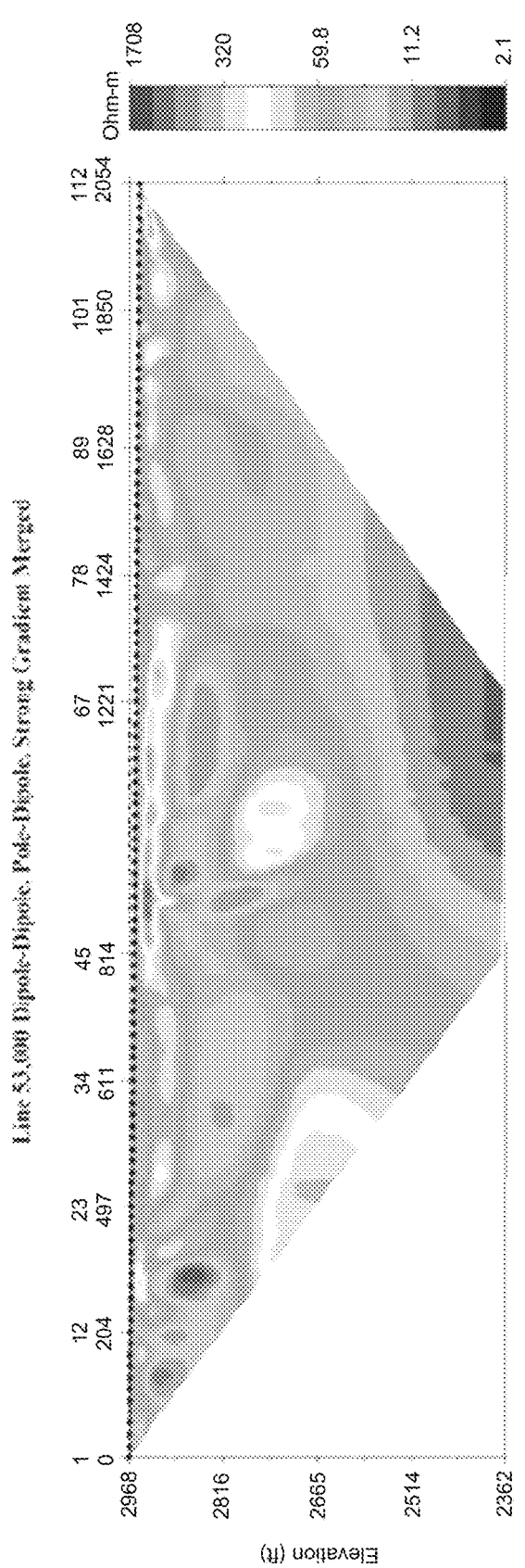
FIG. 13B illustrates an example 2D resistivity profile for long line 2 of the example wellsite of FIGS. 12A-12G.
Figure 13C:
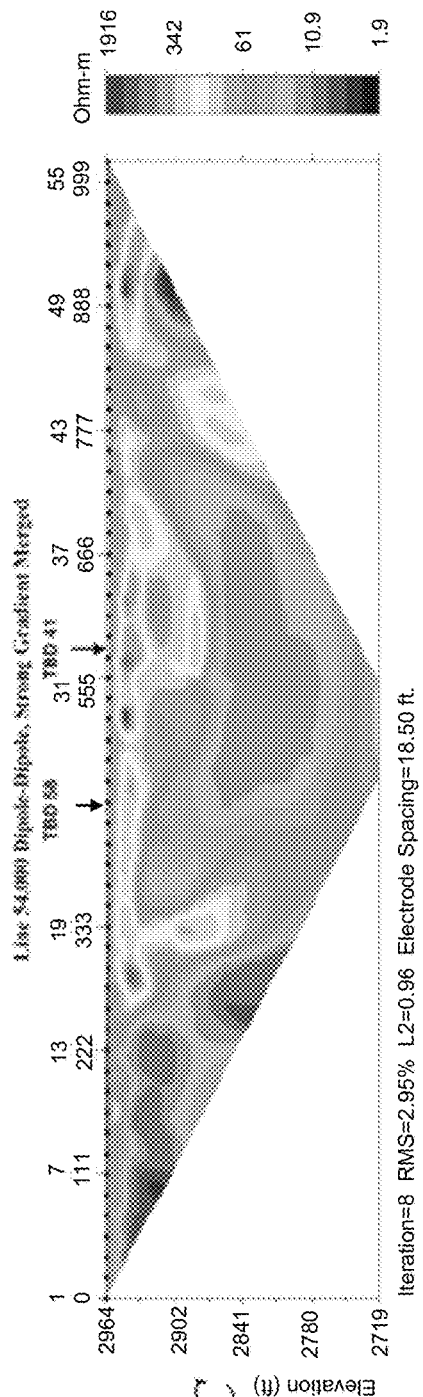
FIG. 13C illustrates an example 2D resistivity profile for short line 1 of the example wellsite of FIGS. 12A-12G.
Figure 13D:
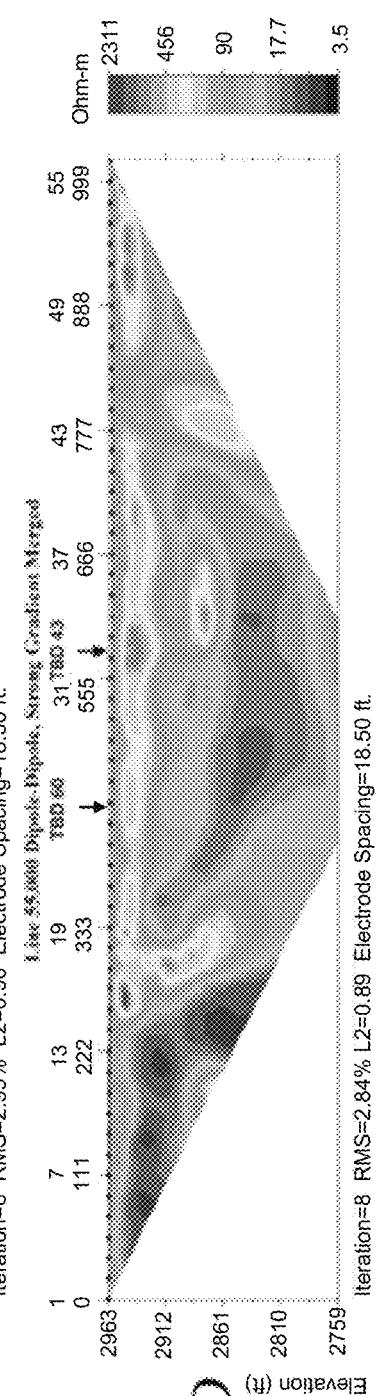
FIG. 13D illustrates an example 2D resistivity profile for short line 2 of the example wellsite of FIGS. 12A-12G.
Figure 13E:
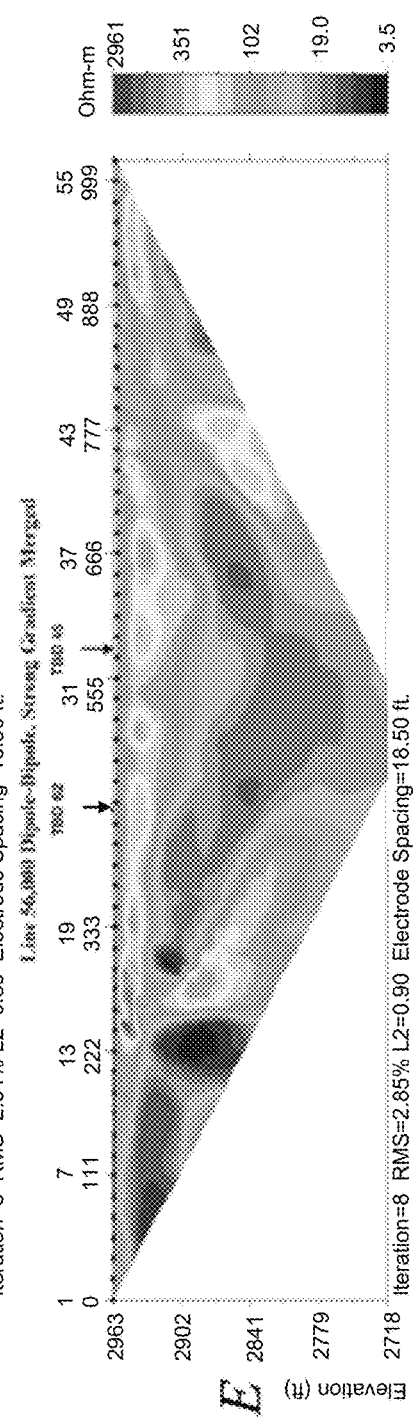
FIG. 13E illustrates an example 2D resistivity profile for short line 3 of the example wellsite of FIGS. 12A-12G.
Figure 13I:
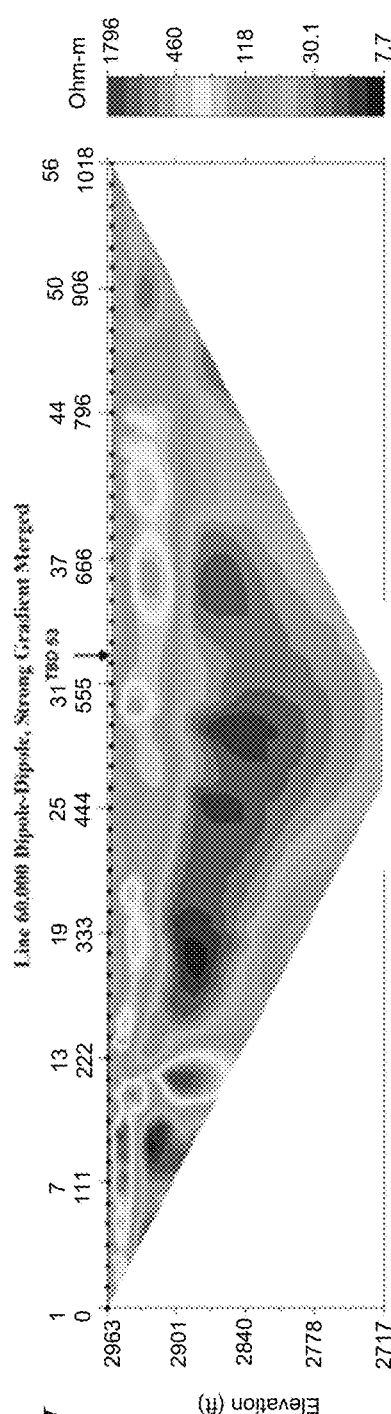
FIG. 13I illustrates an example 2D resistivity profile for short line 7 of the example wellsite of FIGS. 12A-12G.
Figure 13J:
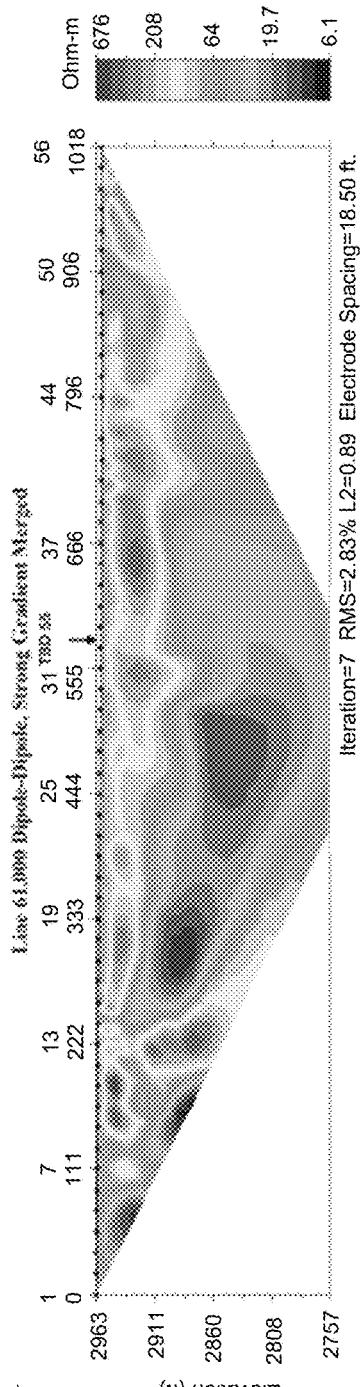
FIG. 13J illustrates an example 2D resistivity profile for short line 8 of the example wellsite of FIGS. 12A-12G.
Figure 13K:
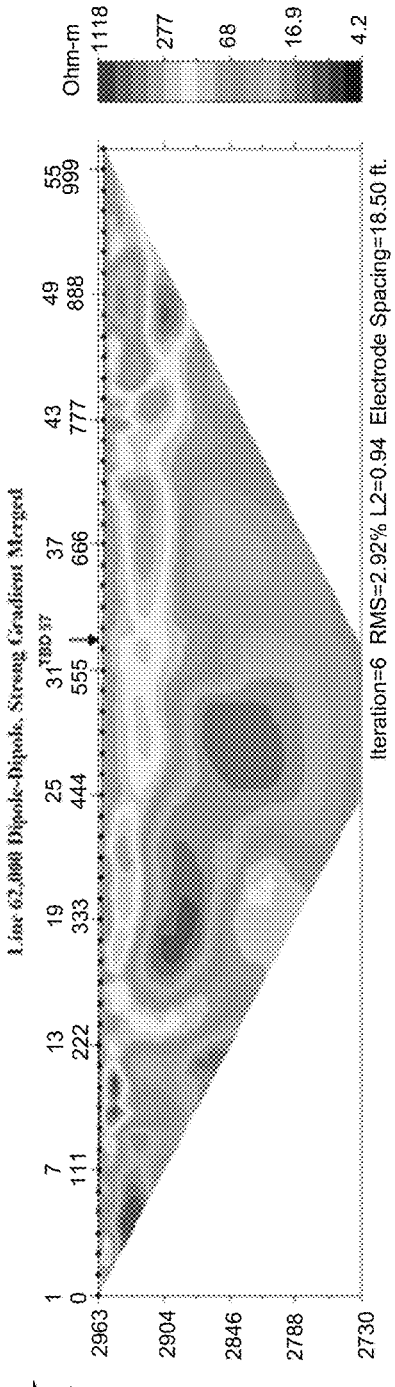
FIG. 13K illustrates an example 2D resistivity profile for short line 9 of the example wellsite of FIGS. 12A-12G.
Figure 14B:
FIG. 14B illustrates a satellite image showing no surface karst at the proposed drilling pad of the example wellsite.
Figure 14C:
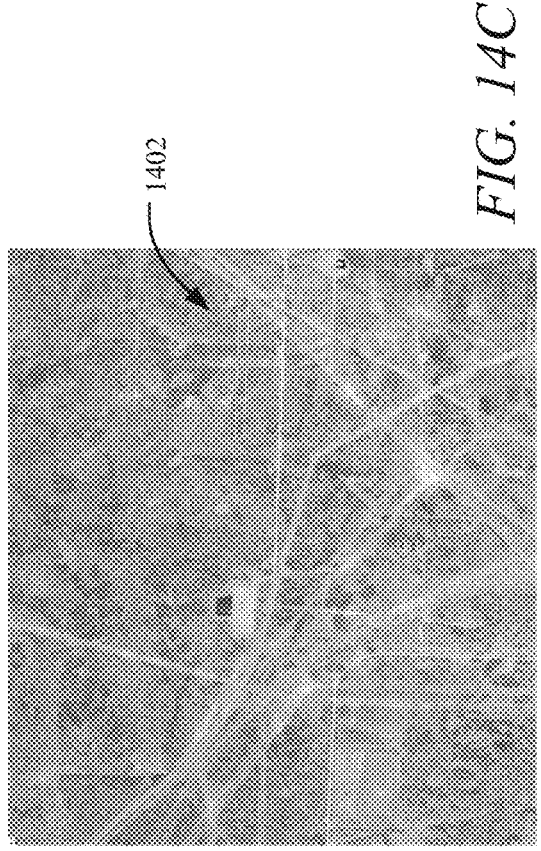
FIG. 14C illustrates LiDAR and areal imagery showing clean surface conditions at the proposed drilling pad of the example wellsite.
Figure 14A:
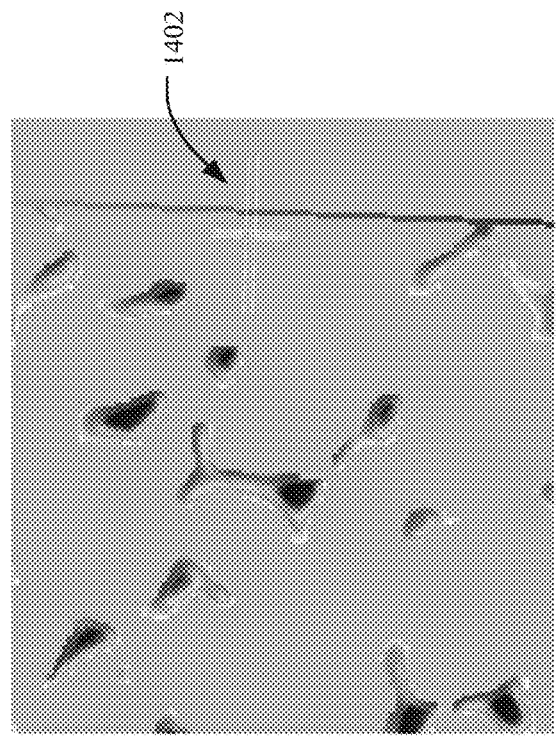
FIG. 14A illustrates an image showing no air-borne gravity anomaly at a proposed drilling pad of another example wellsite.
Figure 14D:
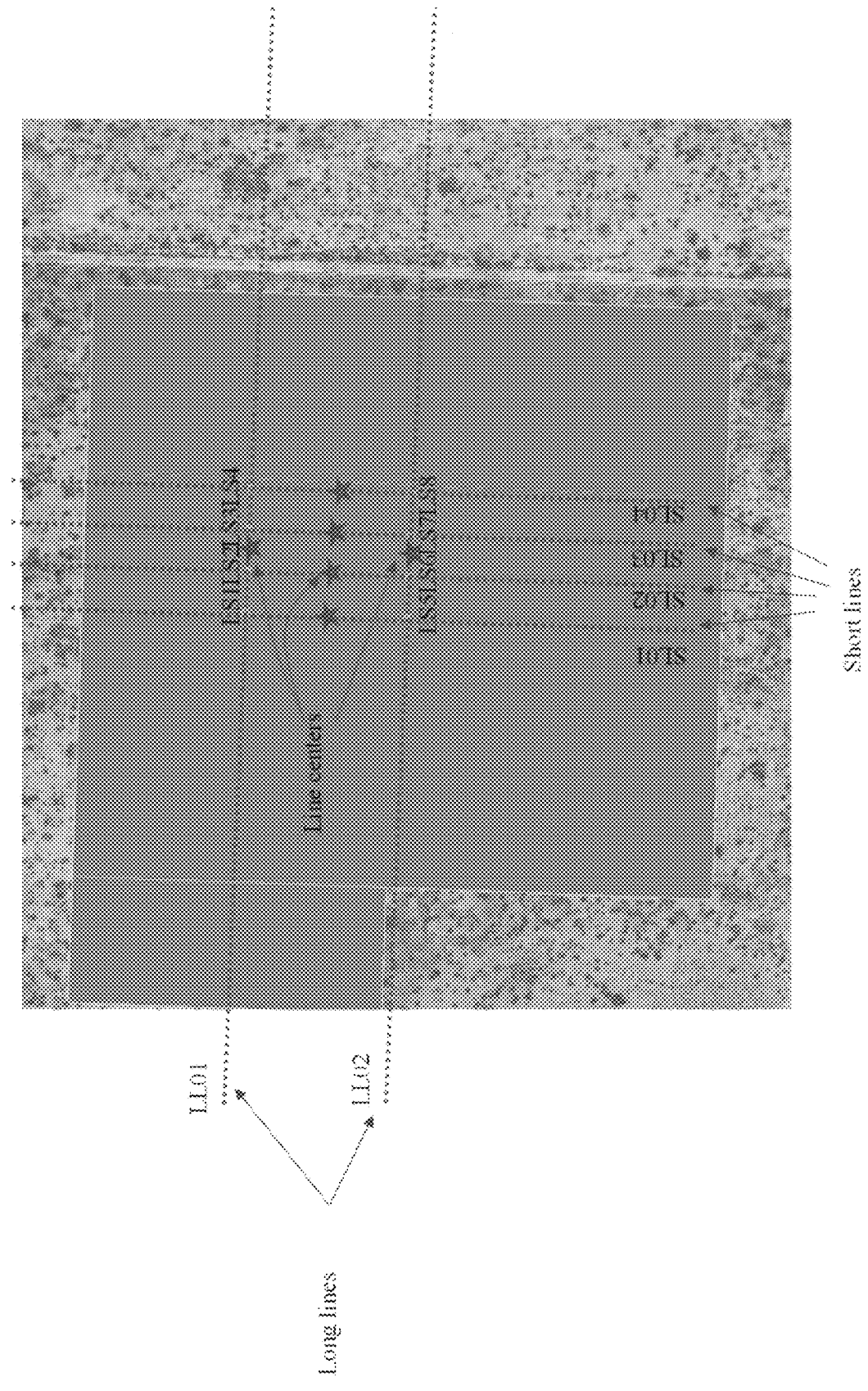
FIG. 14D shows a diagram for ground resistivity at the example wellsite.
Figure 14E:
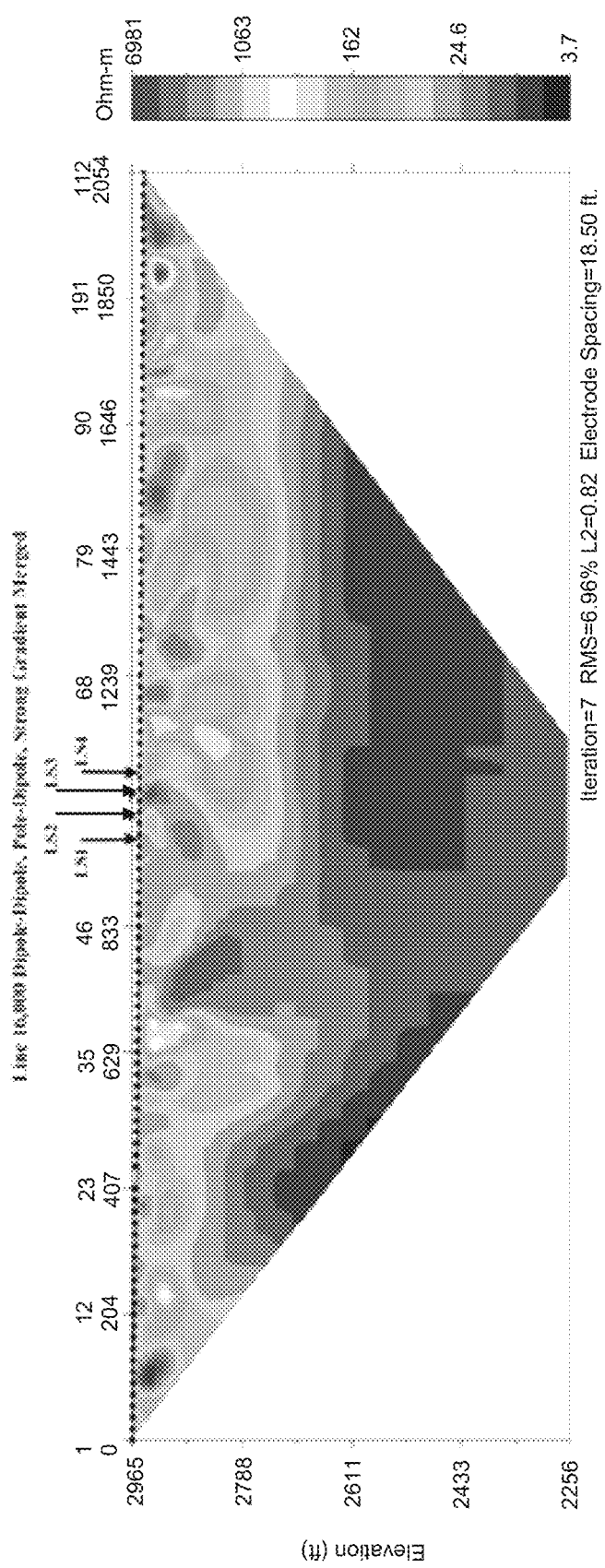
FIG. 14E is an example resistivity profile for long line 1 at the example wellsite.
Figures 14F, 14G:
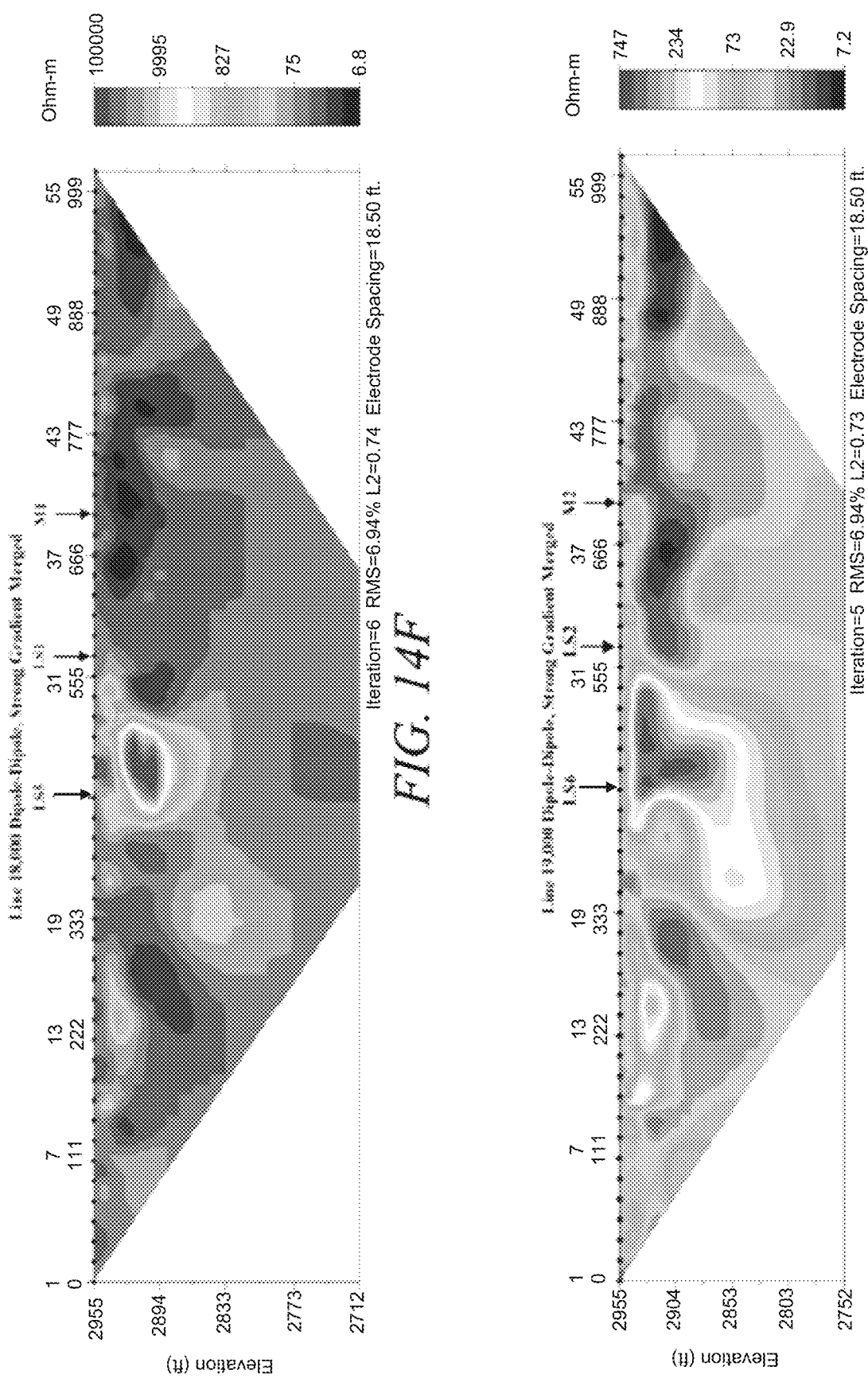
FIG. 14F is an example resistivity profile for short line 1 at the example wellsite.
FIG. 14G is an example resistivity profile for short line 2 at the example wellsite.
Figures 14H, 14I:
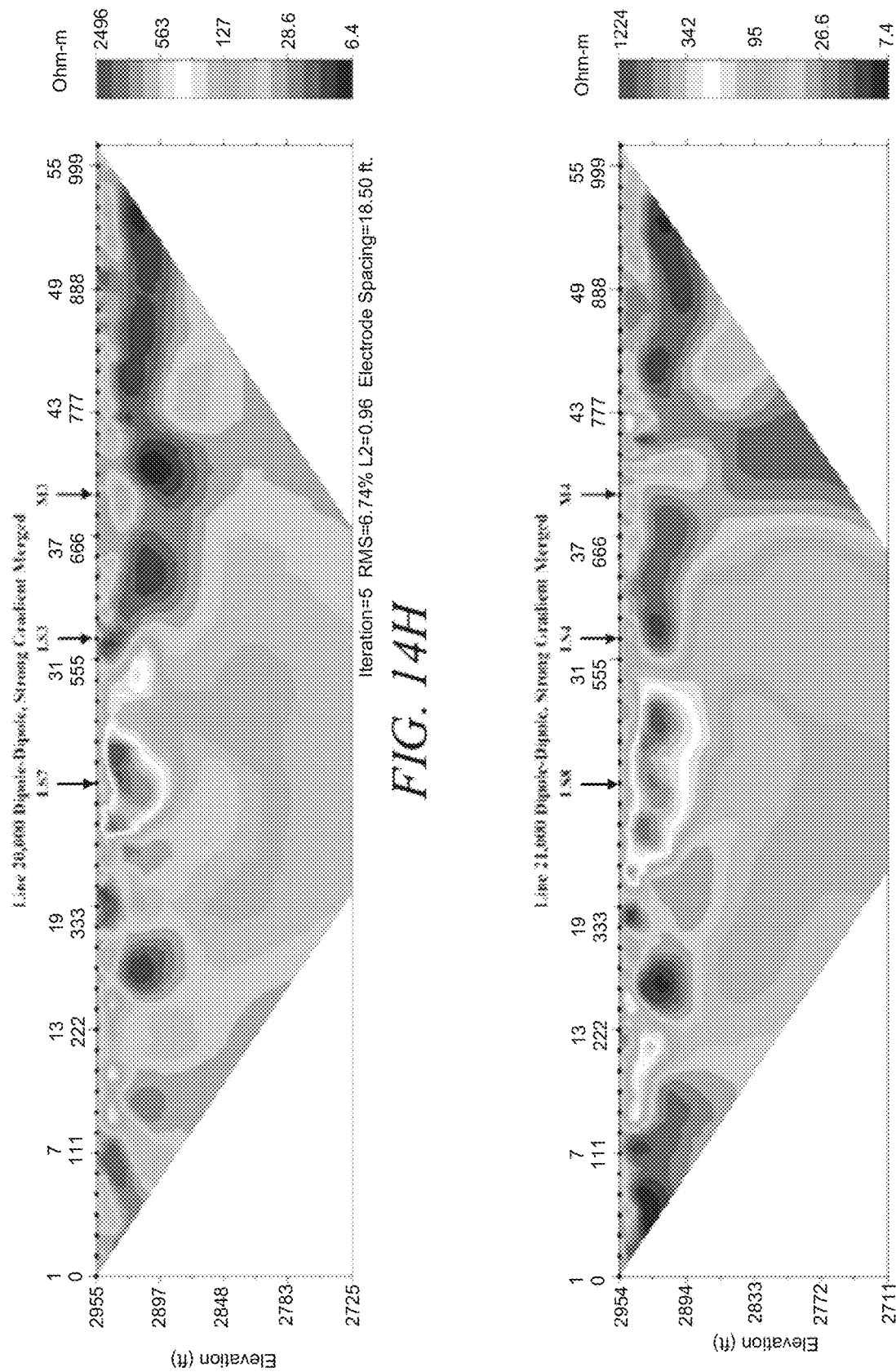
FIG. 14H is an example resistivity profile for short line 3 at the example wellsite.
FIG. 14I is an example resistivity profile for short line 4 at the example wellsite.
Figure 14J:
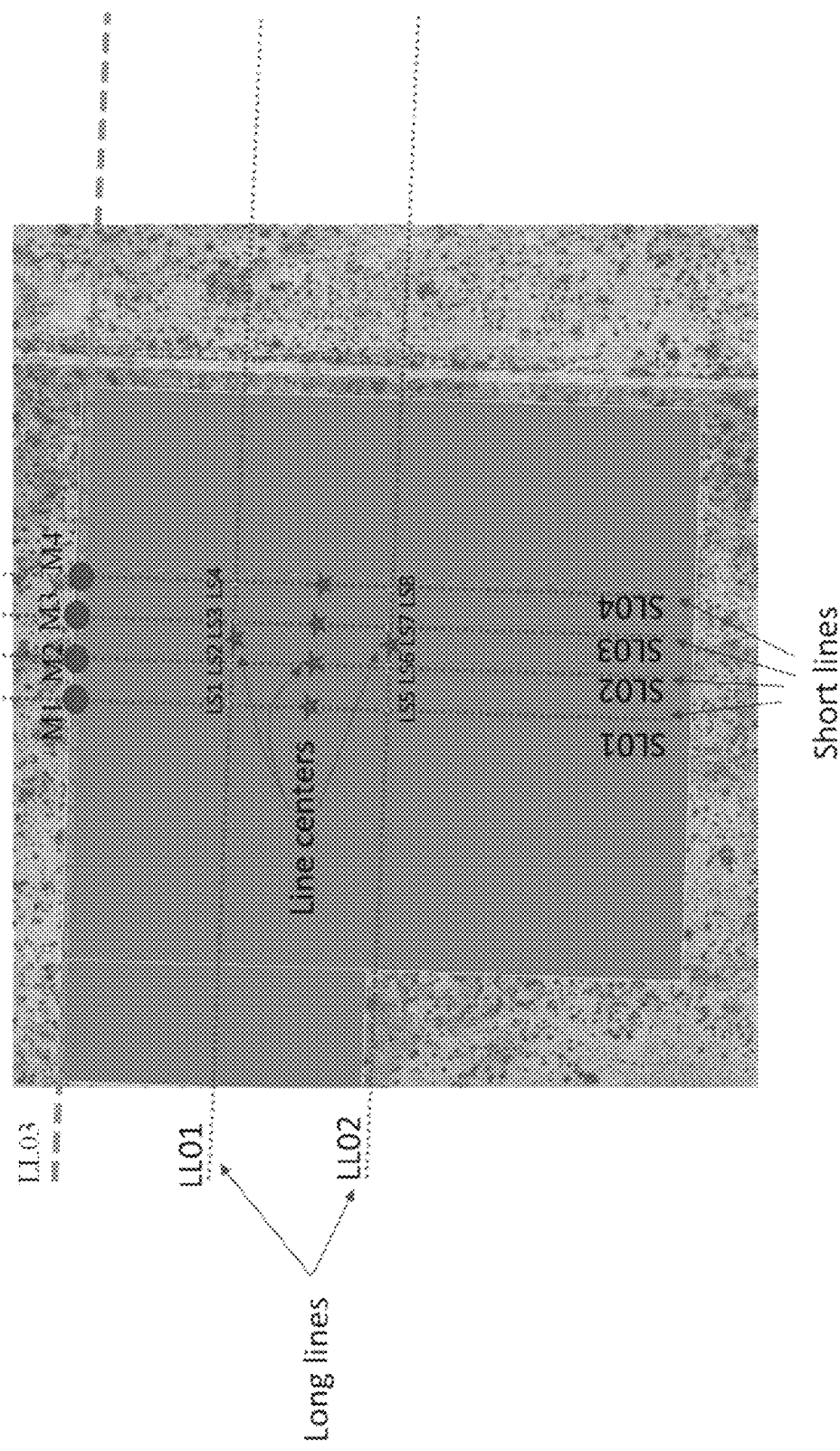
FIG. 14J shows the diagram for ground resistivity at the example wellsite with proposed locations moved.
Figure 14K:
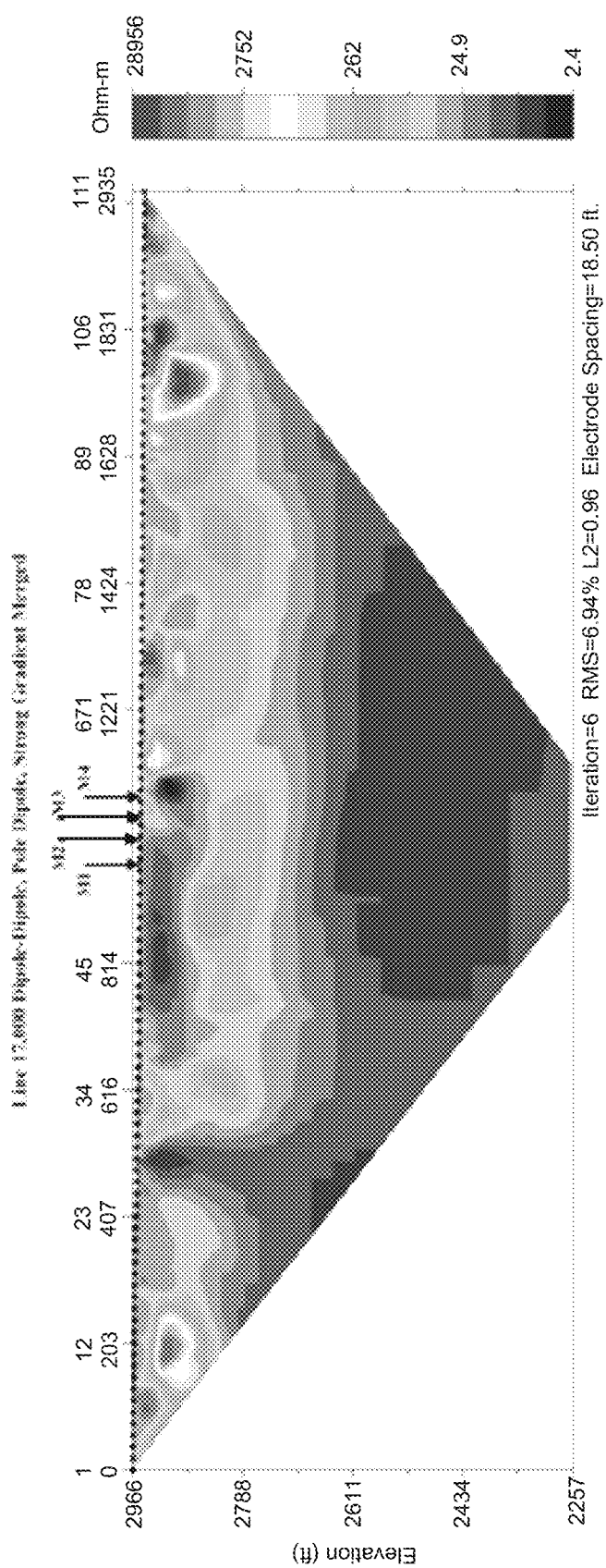
FIG. 14K shows an example resistivity profile for long line 3 at the example wellsite following the move of the locations.

Turning to FIGS. 12A-13K, example resistivity profiles for an example wellsite are illustrated. The resistivity profiles depicted in FIGS. 12A-12G show 3D resistivity profiles, while FIGS. 13A-13K illustrate 2D resistivity profiles for the example wellsite. FIG. 12A depicts an apparent resistivity crossplot; FIG. 12B shows an inverted resistivity image; FIG. 12C illustrates a 3D resistivity contour plot; FIG. 12D shows another 3D resistivity contour plot, focused on zones that are less than 10 ohm-meters; FIG. 12E shows another 3D resistivity contour plot, focused on zones that are greater than 1000 ohm-meters; FIG. 12F shows another 3D resistivity contour plot, focused on zones that are between 300-800 ohm-meters; and FIG. 12G shows another view of the 3D resistivity contour plot, focused on the zones that are between 300-800 ohm-meters. Meanwhile, FIGS. 13A and 13B illustrate 2D resistivity profiles for long line 1 and long line 2, respectively, of the wellsite, and FIGS. 13C-13K illustrate 2D resistivity profiles for short lines 1-9, respectively, of the wellsite FIGS. 14A-14K illustrate an example survey and analysis of subterranean features for another example wellsite. In this example, airborne gravity data, satellite data, topography and seismic data are utilized to select a drilling pad location and 8 surface hole locations (SHL). A resistivity survey is utilized to further evaluate subsurface karst at the proposal SHLs. Referring to FIGS. 14A-C, airborne gravity data indicates that there is no air-born gravity anomaly present at the proposed drilling pad location 1402, no surface karst is detected from satellite data at the proposed drilling pad location 1402, and the proposed drilling pad location 1402 has a clean surface condition based on LiDAR and areal imagery data. Turning to FIG. 14D, a ground resistivity survey design is depicted. In one implementation, line centers are defined by wellhead locations, with two long lines passing through wellheads and each line having 112 probes with 18.5 feet of spacing between the probes. Further, four short lines are oriented perpendicularly to the long lines at the well locations, with each short line having 56 probes and 18.5 feet of spacing between the probes. As shown in FIGS. 14E-I, the resistivity data shows that the long line 1 indicates no karst present at locations 1-4, while the short lines 1 and 2 indicate air-filled karsts and the locations 5 and 6 and the short lines 3 and 4 indicate air-filled karsts at locations 7 and 8. FIG. 14J shows an updated resistivity survey following movement of locations 5-8 to new locations corresponding to long line 3. FIG. 14K shows resistivity data where long line 3 indicates no karst at the new locations. Thus, in this example, four wells were moved and the wells were drilled without incident, successfully avoiding karsts.

Figure 15:
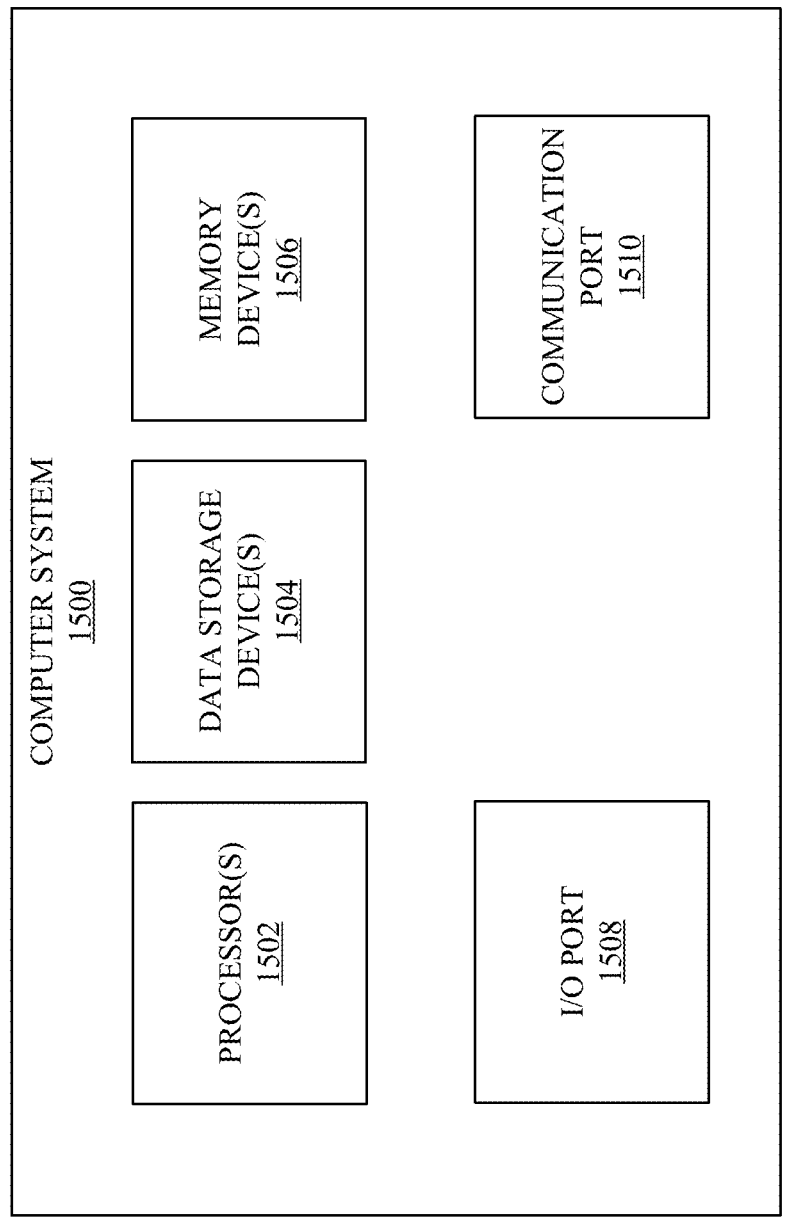
FIG. 15 shows an example computing system configured to implement the presently disclosed technology.

Referring to FIG. 15, a detailed description of an example computing system 1500 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 1500 may be a computing system is capable of executing a computer program product to execute a computer process. Data and program files may be input to the computer system 1500, which reads the files and executes the programs therein. Some of the elements of the computer system 1500 are shown in FIG. 15, including one or more hardware processors 1502, one or more data storage devices 1504, one or more memory devices 1508, and/or one or more ports 1508-1510. Additionally, other elements that will be recognized by those skilled in the art may be included in the computing system 1500 but are not explicitly depicted in FIG. 15 or discussed further herein. Various elements of the computer system 1500 may communicate with one another by way of one or more communication buses, point-to-point communication paths, or other communication means not explicitly depicted in FIG. 15.

The processor 1502 may include, for example, a central processing unit (CPU), a microprocessor, a microcontroller, a digital signal processor (DSP), and/or one or more internal levels of cache. There may be one or more processors 1502, such that the processor 1502 comprises a single central-processing unit, or a plurality of processing units capable of executing instructions and performing operations in parallel with each other, commonly referred to as a parallel processing environment.

The computer system 1500 may be a conventional computer, a distributed computer, or any other type of computer, such as one or more external computers made available via a cloud computing architecture. The presently described technology is optionally implemented in software stored on the data stored device(s) 1504, stored on the memory device(s) 1506, and/or communicated via one or more of the ports 1508-1510, thereby transforming the computer system 1500 in FIG. 15 to a special purpose machine for implementing the operations described herein. Examples of the computer system 1500 include personal computers, terminals, workstations, mobile phones, tablets, laptops, personal computers, multimedia consoles, gaming consoles, set top boxes, and the like.

The one or more data storage devices 1504 may include any non-volatile data storage device capable of storing data generated or employed within the computing system 1500, such as computer executable instructions for performing a computer process, which may include instructions of both application programs and an operating system (OS) that manages the various components of the computing system 1500. The data storage devices 1504 may include, without limitation, magnetic disk drives, optical disk drives, solid state drives (SSDs), flash drives, and the like. The data storage devices 1504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1504 and/or the memory devices 1506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1500 includes one or more ports, such as an input/output (I/O) port 1508 and a communication port 1510, for communicating with other computing, network, or vehicle devices. It will be appreciated that the ports 1508-1510 may be combined or separate and that more or fewer ports may be included in the computer system 1500.

The I/O port 1508 may be connected to an I/O device, or other device, by which information is input to or output from the computing system 1500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1500 via the I/O port 1508. Similarly, the output devices may convert electrical signals received from computing system 1500 via the I/O port 1508 into signals that may be sensed as output by a human, such as sound, light, and/or touch. The input device may be an alphanumeric input device, including alphanumeric and other keys for communicating information and/or command selections to the processor 1502 via the I/O port 1508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1500 via the I/O port 1508. For example, an electrical signal generated within the computing system 1500 may be converted to another type of signal, and/or vice-versa. In one implementation, the environment transducer devices sense characteristics or aspects of an environment local to or remote from the computing device 1500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1500, such as, physical movement of some object (e.g., a mechanical actuator), heating or cooling of a substance, adding a chemical substance, and/or the like.

In one implementation, a communication port 1510 is connected to a network by way of which the computer system 1500 may receive network data useful in executing the methods and systems set out herein as well as transmitting information and network configuration changes determined thereby. Stated differently, the communication port 1510 connects the computer system 1500 to one or more communication interface devices configured to transmit and/or receive information between the computing system 1500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1510 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1510 may communicate with an antenna or other link for electromagnetic signal transmission and/or reception.

In an example implementation, surface mapping, airborne gravity, three dimensional seismic data, and/or resistivity logs, and software and other modules and services may be embodied by instructions stored on the data storage devices 1504 and/or the memory devices 1506 and executed by the processor 1502.

The system set forth in FIG. 15 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for obstacle avoidance in a subterranean formation in connection with a drilling operation, the method comprising:
   receiving a data set for an area of interest of the subterranean formation from at least one of one or more light detection and ranging (LiDAR) systems, one or more satellite imagery systems, one or more air-borne gravity systems, or one or more three-dimensional seismic systems;
   identifying a potential surface pad location for the area of interest using the data set, the potential surface pad location including a surface hole for a wellbore;
   generating a survey for the potential surface pad location based on the data set;
   determining, using the survey for the potential surface pad location, whether one or more obstacles are present in the subterranean formation disposed relative to the potential surface pad location; and
   adjusting the potential surface pad location when the one or more obstacles are present in the subterranean formation disposed relative to the potential surface pad location.

2. The method of claim 1, wherein the survey includes a resistivity survey, the one or more obstacles include karst features disposed shallow in the subterranean formation relative to the surface hole.

3. The method of claim 1 further comprising determining whether the one or more obstacles are present in the subterranean formation using a three-dimensional (3D) seismic data set acquired for the potential surface pad location, wherein, the one or more obstacles include karst features disposed deep in the subterranean formation relative to the surface hole.

4. The method of claim 1, wherein the survey includes a resistivity survey.

5. The method of claim 4, wherein the resistivity survey is generated using one or more first lines and one or more second lines.

6. The method of claim 5, wherein the one or more first lines extend through the surface hole and the one or more second lines intersect the one or more first lines at the surface hole.

7. The method of claim 5, wherein the one or more first lines and the one or more second lines include a plurality of electrodes.

8. The method of claim 7, wherein the plurality of electrodes are disposed along a length of at least one of the one or more first lines or the one or more second lines with an even spacing.

9. The method of claim 5, wherein the one or more first lines are longer than the one or more second lines.

10. The method of claim 9, wherein a distal electrode is linearly disposed from an end of the one or more first lines.

11. The method of claim 1, wherein the data set includes surface mapping data.

12. The method of claim 1, wherein the data set includes surface topography data.

13. The method of claim 1, wherein the data set includes an airborne gravity data set.

14. The method of claim 1, wherein the data set includes a seismic data set.

15. A method for obstacle avoidance in a subterranean formation in connection with a drilling operation, the method comprising:
   receiving a data set for an area of interest of the subterranean formation;
   identifying a potential surface pad location for the area of interest using the data set, the potential surface pad location including a surface hole for a wellbore;
   generating a survey for the potential surface pad location based on the data set;
   generating a resistivity profile for the potential surface pad location;
   detecting one or more obstacles present in the subterranean formation disposed relative to the potential surface pad location based on the resistivity profile; and
   adjusting the potential surface pad location when the one or more obstacles are present in the subterranean formation disposed relative to the potential surface pad location.

16. The method of claim 15, wherein the one or more obstacles include karst features disposed in the subterranean formation.

17. The method of claim 15, wherein the data set includes at least one of surface mapping data, surface topography data, an airborne gravity data set, or a seismic data set.

18. The method of claim 15, wherein the survey is generated using one or more first lines and one or more second lines, the one or more first lines extending through the surface hole and the one or more second lines intersecting the one or more first lines at the surface hole.

19. The method of claim 18, wherein the one or more first lines and the one or more second lines include a plurality of electrodes.

20. The method of claim 15, wherein the data set is received from at least one of one or more light detection and ranging (LiDAR) systems, one or more satellite imagery systems, one or more air-borne gravity systems, or one or more three-dimensional seismic systems.

\* \* \* \* \*